(12) United States Patent
Ikeda et al.

(10) Patent No.: US 11,644,417 B2
(45) Date of Patent: May 9, 2023

(54) GAS DETECTION APPARATUS

(71) Applicant: Asahi Kasei Microdevices Corporation, Tokyo (JP)

(72) Inventors: Yuji Ikeda, Kyoto (JP); Keiichiro Kuwata, Tokyo (JP); Takaaki Furuya, Tokyo (JP)

(73) Assignee: Asahi Kasei Microdevices Corporation, Tokyo (JP)

(*) Notice: Subject to any disclaimer, the term of this patent is extended or adjusted under 35 U.S.C. 154(b) by 224 days.

(21) Appl. No.: 17/191,901

(22) Filed: Mar. 4, 2021

(65) Prior Publication Data

US 2021/0285870 A1 Sep. 16, 2021

(30) Foreign Application Priority Data

Mar. 11, 2020 (JP) .............................. JP2020-042186
Mar. 1, 2021 (JP) .............................. JP2021-032047

(51) Int. Cl.
*G01N 21/3504* (2014.01)

(52) U.S. Cl.
CPC . *G01N 21/3504* (2013.01); *G01N 2021/3545* (2013.01); *G01N 2201/0636* (2013.01); *G01N 2201/08* (2013.01)

(58) Field of Classification Search
CPC ....... G01N 21/3504; G01N 2021/3545; G01N 2201/0636; G01N 2201/08
See application file for complete search history.

(56) References Cited

U.S. PATENT DOCUMENTS

2013/0026369 A1* 1/2013 Gibson .............. G01N 21/3504
156/60
2019/0145828 A1 5/2019 Lin et al.

FOREIGN PATENT DOCUMENTS

| JP | 2013517467 A | 5/2013 |
|---|---|---|
| JP | 2015184211 A | 10/2015 |
| JP | 2017015567 A | 1/2017 |

* cited by examiner

*Primary Examiner* — Jamil Ahmed
(74) *Attorney, Agent, or Firm* — Kenja IP Law PC

(57) ABSTRACT

Provided is a gas detection apparatus which suppresses occurrences of distortions of the optical path to reduce fluctuations of the gas detection sensitivity. A gas detection apparatus 1 includes a substrate 2; a light emitting element 3 disposed in a first region 21 in a main surface 20 of the substrate 2 for emitting light; a light receiving element 4 disposed in a second region 22 in the main surface 20 of the substrate 2 for receiving the light; a light guide member 5 for guiding the light emitted by the light emitting element 3 to the light receiving element 4; and a joint member 6 joining the substrate 2 and the light guide member 5. The joint member 6 serves as a rotation axis when the light guide member 5 is displaced relative to the substrate 2.

13 Claims, 22 Drawing Sheets

GAS DETECTION APPARATUS

CROSS-REFERENCE TO RELATED APPLICATION

The present application claims priority to and the benefit of Japanese Patent Application No. 2020-042186 filed Mar. 11, 2020 and Japanese Patent Application No. 2021-32047 filed Mar. 1, 2021, the entire contents of which are incorporated herein by reference.

TECHNICAL FIELD

The present disclosure relates to a gas detection apparatus.

BACKGROUND

Gas detection apparatuses for detecting gases have been used in various fields. For example, PTL 1 discloses an apparatus including a light source for emitting infrared light and a detector for detecting infrared light in a certain wavelength, accommodated in the same case. A gas to be detected is introduced to the case.

CITATION LIST

Patent Literature

PTL 1: JP 2015-184211 A

SUMMARY

Here, in the gas detection apparatus disclosed in PTL 1, the optical path pipe is securely joined to the substrate and the case by grooves in the substrate fixing portion and fixing members. Accordingly, in case of a thermal expansion, the thermal expansion may cause distortions of the substrate and the case, for example, may be transmitted to the optical path pipe, which may distort the optical path or alter the relative positions of optical surfaces. As a result, the gas detection sensitivity may fluctuate.

In light of the aforementioned issue, it would be thus helpful to provide gas detection apparatuses which suppress occurrences of distortions of the optical path to reduce fluctuations of the gas detection sensitivity.

A gas detection apparatus according to an embodiment of the present disclosure comprises:

a substrate;

a light emitting element provided in a first region in a main surface of the substrate for emitting light;

a light receiving element provided in a second region in the main surface of the substrate for receiving the light;

a light guide member for guiding the light emitted by the light emitting element to the light receiving element; and a joint member joining the substrate and the light guide member, the joint member serving as a rotation axis when the light guide member is displaced relative to the substrate.

A gas detection apparatus according to an embodiment of the present disclosure comprises:

a substrate comprising a light emitting element for emitting light and a light receiving element for receiving the light, the light emitting element and the light receiving element being provided on a main surface of the substrate;

a light guide member for guiding the light emitted by the light emitting element to the light receiving element; and a joint member which is a columnar body and comprises a first bottom portion joining to the substrate and a second bottom portion joining to the light guide member, the substrate and the light guide member being joined only by the joint member.

A gas detection apparatus according to an embodiment of the present disclosure comprises:

a substrate;

a light emitting element provided in a first region in a main surface of the substrate for emitting light;

a light receiving element provided in a second region in the main surface of the substrate for receiving the light;

a light guide member for guiding the light emitted by the light emitting element to the light receiving element; and a joint member joining the substrate and the light guide member to fix the light guide member to the substrate, the gas detection apparatus having an orthogonally applied unit pressure maximum distortion ratio of 143/GPa or more and 10000/GPa or less.

According to embodiments of the present disclosure, gas detection apparatuses are provided which suppress occurrences of distortions of the optical path to reduce fluctuations of the gas detection sensitivity.

DETAILED DESCRIPTION

First Embodiment

Figure 1:
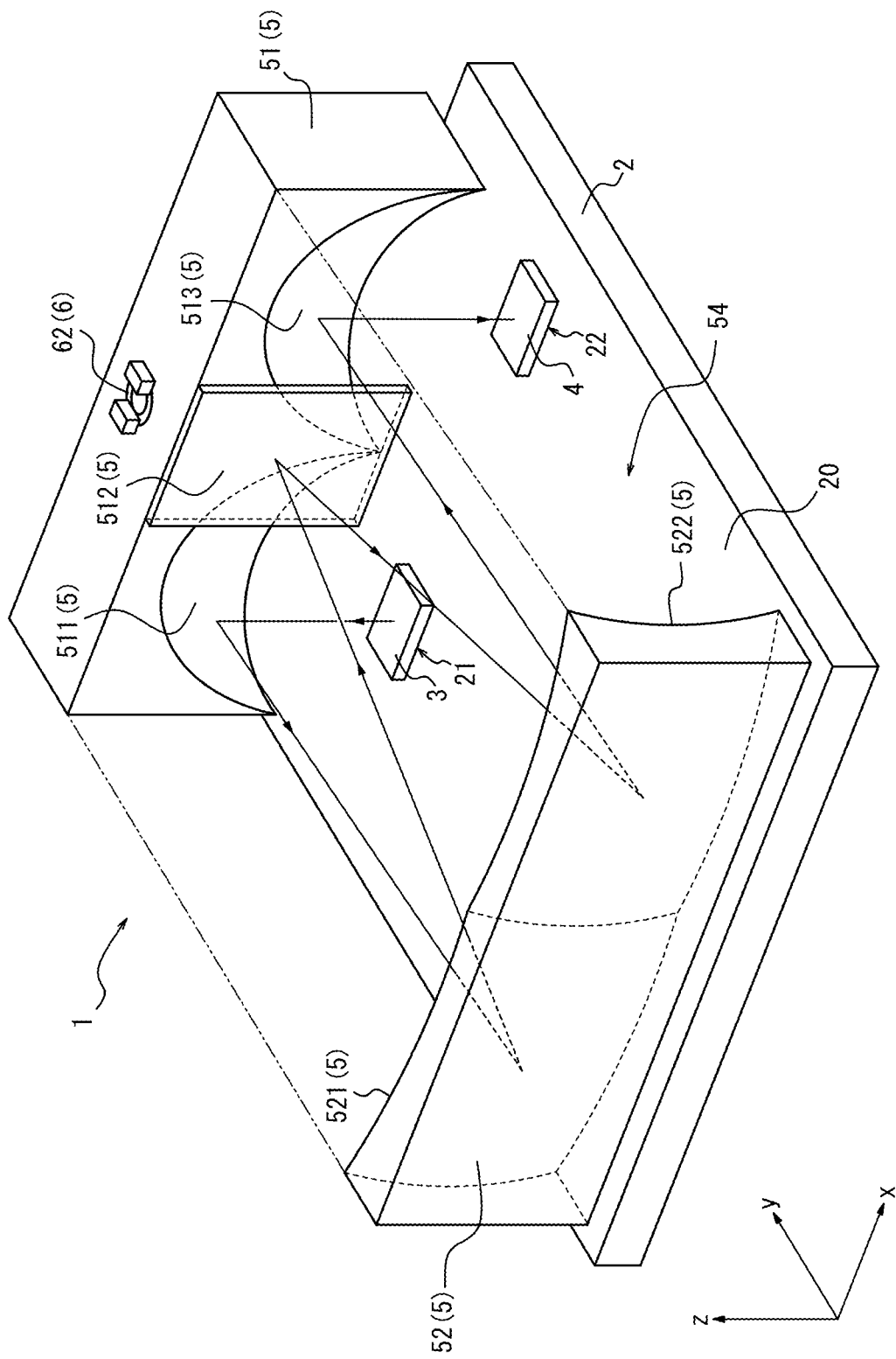
FIG. 1 is a perspective view illustrating a gas detection apparatus according to an embodiment of the present disclosure, a part of which is made transparent.

FIG. 1 is a perspective view illustrating a gas detection apparatus 1 according to an embodiment of the present disclosure, a part of which is made transparent. In one example, the gas detection apparatus 1 is a small-sized apparatus with dimensions of 30 mm×20 mm×10 mm, and is also referred to as a "gas sensor". In the present embodiment, the gas detection apparatus 1 is an apparatus employing the non-dispersive infrared (NDIR) spectroscopy for measuring the density of a gas to be detected based on infrared light which has transmitted through the introduced gas. Examples of the gas to be detected include carbon dioxide, water vapor, methane, propane, formaldehyde, carbon monoxide, nitric oxide, ammonium, sulfur dioxide, and alcohol.

The gas detection apparatus 1 includes a substrate 2, a light emitting element 3, a light receiving element 4, a light guide member 5, and a joint member 6. FIG. 1 illustrates an example configuration of the gas detection apparatus 1 in which a part of the light guide member 5 is made transparent so that the light emitting element 3 and the light receiving element 4 provided on the main surface 20 of the substrate 2 are visible. In the present embodiment, the main surface 20 is the surface facing the light guide member 5 among the largest surfaces of the substrate 2.

Hereinafter, as illustrated in FIG. 1, the rectangular coordinate system is defined so that xy-planes are parallel to the main surface 20 of the substrate 2. The z-axis direction is the direction orthogonal to the main surface 20 of the substrate 2. The x- and y-axis directions are parallel to the sides of the main surface 20 of the substrate 2. Here, the y-axis direction corresponds to the direction along which a first reflecting portion 51 and a second reflecting portion 52 to be described later face to each other.

The substrate 2 is a plate-shaped member on which components of the gas detection apparatus 1 are amounted, providing electrical connections between the mounted electronic components. The light emitting element 3 and the light receiving element 4 are provided on the main surface 20 of the substrate 2. Other electronic components may also be mounted on the substrate 2. For example, a controller for controlling at least one of the light emitting element 3 and the light receiving element 4 may be provided on the main surface 20 or the bottom surface opposite to the main surface 20 of the substrate 2. Additionally, a computation unit for carrying out computations for calculating the gas density may also be provided on the main surface 20 or the bottom surface of the substrate 2. The computation unit may include at least one of a general-purpose processor that performs functions according to a program that is read, and a dedicated processor specialized for particular processing. The dedicated processor may include an application specific integrated circuit (ASIC). The processor may include a programmable logic device (PLD). The computation unit may be integrated with the controller described above.

The light emitting element 3 is a component for emitting light used for detection of the gas to be detected. The light emitting element 3 is not particularly limited as long as it outputs light including light components in wavelengths absorbable by the gas to be detected. In the present embodiment, the light emitted by the light emitting element 3 is, but not limited to, infrared light. The light emitting element 3 is a light emitting diode (LED) in the present embodiment. In another example, the light emitting element 3 may be a semiconductor laser, an organic light emitting element, a micro electro mechanical systems (MEMS) heater, or the like. The light emitting element 3 is provided in a first region 21 in the main surface 20 of the substrate 2. The z-axis directional position of the first region 21 is set so that the first region 21 faces a first mirror 511 to be described later.

The light receiving element 4 is a component for receiving light which has transmitted through the introduced gas. The light receiving element 4 is not particularly limited as long as it has sensitivity to light in bandwidths including wavelengths absorbable by the gas to be detected. In the present embodiment, the light receiving element 4 receives, but is not limited to, infrared light. The light receiving element 4 is a photodiode in the present embodiment. In another example, the light receiving element 4 may be a phototransistor or a thermopile, a pyroelectric sensor, a bolometer, or the like. The light receiving element 4 converts the received light into an electrical signal, and outputs the converted electrical signal. The electric signal is output to, for example, the computation unit. The computation unit receives the electrical signal, and calculates the density of the gas to be detected based on a property such as the transmittance of the light. The light receiving element 4 is provided in a second region 22 in the main surface 20 of the substrate 2. The z-axis directional position of the second region 22 is set so that the second region 22 faces a fifth mirror 513 to be described later. The light receiving element 4 may include an optical filter having a wavelength selection function.

The light guide member 5 is a member for guiding the light emitted by the light emitting element 3 to the light receiving element 4. The light guide member 5 is an optical system of the gas detection apparatus 1. The light guide member 5 includes optical members to configure an optical path from the light emitting element 3 to the light receiving element 4. In other words, the light guide member 5 optically couples the light emitting element 3 and the light receiving element 4. Here, the optical members are a mirror and a lens, for example.

In the present embodiment, the light guide member 5 includes a first reflecting portion 51 and a second reflecting portion 52. The first reflecting portion 51 includes a first mirror 511, a third mirror 512, and a fifth mirror 513 as optical members. The first reflecting portion 51 includes a mirror that reflects light emitted by the light emitting element 3 for the first time and a mirror that reflects the light immediately before the light is received by the light receiving element 4. The second reflecting portion 52 includes a second mirror 521 and a fourth mirror 522 as optical members. The second reflecting portion 52 reflects light to and from the first reflecting portion 51. The light guide member 5 reflects light emitted by the light emitting element 3 with the first mirror 511, the second mirror 521, the third mirror 512, the fourth mirror 522, and the fifth mirror 513, in this order, to guide the light to the light receiving element 4. A cell 54 is provided between the light guide member 5 and the substrate 2, and the optical path is configured to pass through the cell 54 to which the gas is introduced. In another example, the number of the mirrors provided in the light guide member 5 may not be five but may be any number equal to or greater than one. Further, the light guide member 5 may be configured to include a lens or a diffractive optical element in a part of the optical path.

In the light guide member 5, the relative position of the first reflecting portion 51 to the second reflecting portion 52 is fixed. For example, the first reflecting portion 51 and the second reflecting portion 52 may be molded monolithically from a resin. The mirrors of the first reflecting portion 51 and the second reflecting portion 52 may be formed by metal plating subsequent to the monolithic molding. In another example, the first reflecting portion 51 and the second reflective portion 52 may be formed as separate entities and securely fixed to each other by an adhesive, screws, nails, mating, grommets, welding, or the like.

The first mirror 511 is a converging mirror that reflects light emitted from the focal point. The first mirror 511 is, for example, a concave mirror. The first mirror 511 may be shaped to have an elliptic surface. In this embodiment, the first mirror 511 reflects light emitted in the z-axis direction from the light emitting element 3 located at the focal point, toward the xy-plane direction. As used herein, the term "xy-plane direction" refers to a direction having at least one of x- and y-axis directional components. However, the direction cosine of a light beam reflected by the first mirror 511 may also include a z-axis directional component.

The second mirror 521, the third mirror 512, and the fourth mirror 522 reflect respective light that is incident thereon. At least one of the second mirror 521, the third mirror 512, and the fourth mirror 522 may be a converging mirror having a light converging function. At least one of the second mirror 521, the third mirror 512, and the fourth mirror 522 may be, for example, a concave mirror. As illustrated in FIG. 1, the second mirror 521 reflects light that is incident from the first mirror 511, to the third mirror 512. The third mirror 512 reflects light that is incident from the second mirror 521, to the fourth mirror 522. The fourth mirror 522 reflects light that is incident from the third mirror 512, to the fifth mirror 513.

The fifth mirror 513 is a converging mirror for converging incident light on the light receiving element. The fifth mirror 513 is, for example, a concave mirror. The fifth mirror 513 may be shaped to have an elliptic surface. In this embodiment, the fifth mirror 513 reflects incident light in the xy-plane direction from the fourth mirror 522 so that the reflected light has a component in the z-axis direction. Specifically, the fifth mirror 513 reflects incident light so that the light is condensed on the light receiving element 4 located at a focal point.

Examples of the material composing the first mirror 511, the second mirror 521, the third mirror 512, the fourth mirror 522, and the fifth mirror 513 may include, but are not limited to, metals, glass, ceramics, and stainless steels, for example. From the viewpoint of improving the detection sensitivity, these mirrors are preferably made of a material having a low light absorption coefficient and a high reflectance. Specifically, resin housings provided with coating of an alloy containing aluminum, gold, or silver, a dielectric, or a laminate of these materials are preferred. Resin housings coated with gold or an alloy layer containing gold are preferred in view of the reliability and degradation over time. Further, a laminated film of a dielectric is preferably formed on the surface of the metal layer for increasing the reflectance. Formation of the first mirror 511 and the fifth mirror 513 by vapor deposition or plating can achieve a higher productivity and provide improved lightweightness as compared with cases where they are made from a metal material. Further, the difference of the thermal expansion coefficients with the substrate 2 is reduced, which suppresses thermal deformations to thereby prevent fluctuations of the sensitivity. Alternatively, the light guide member 5 may be formed by machining, and is more preferably formed by injection molding in view of the productivity.

The joint member 6 is a member joining the substrate 2 and the light guide member 5. In the present embodiment, the joint member 6 is a columnar body, and includes a first bottom portion 61 joining to the substrate 2 and a second bottom portion 62 joining to the light guide member 5 (see FIG. 2). The first bottom portion 61 and the substrate 2 are joined by, for example, an adhesive, a grommet or screw, welding, a nail, mating, or the like. The second bottom portion 62 and the light guide member 5 are joined in the similar manner. In addition, in view of the productivity, the joint member 6 and the light guide member 5 are preferably molded monolithically in view of reduction of the number of components.

Figure 2:
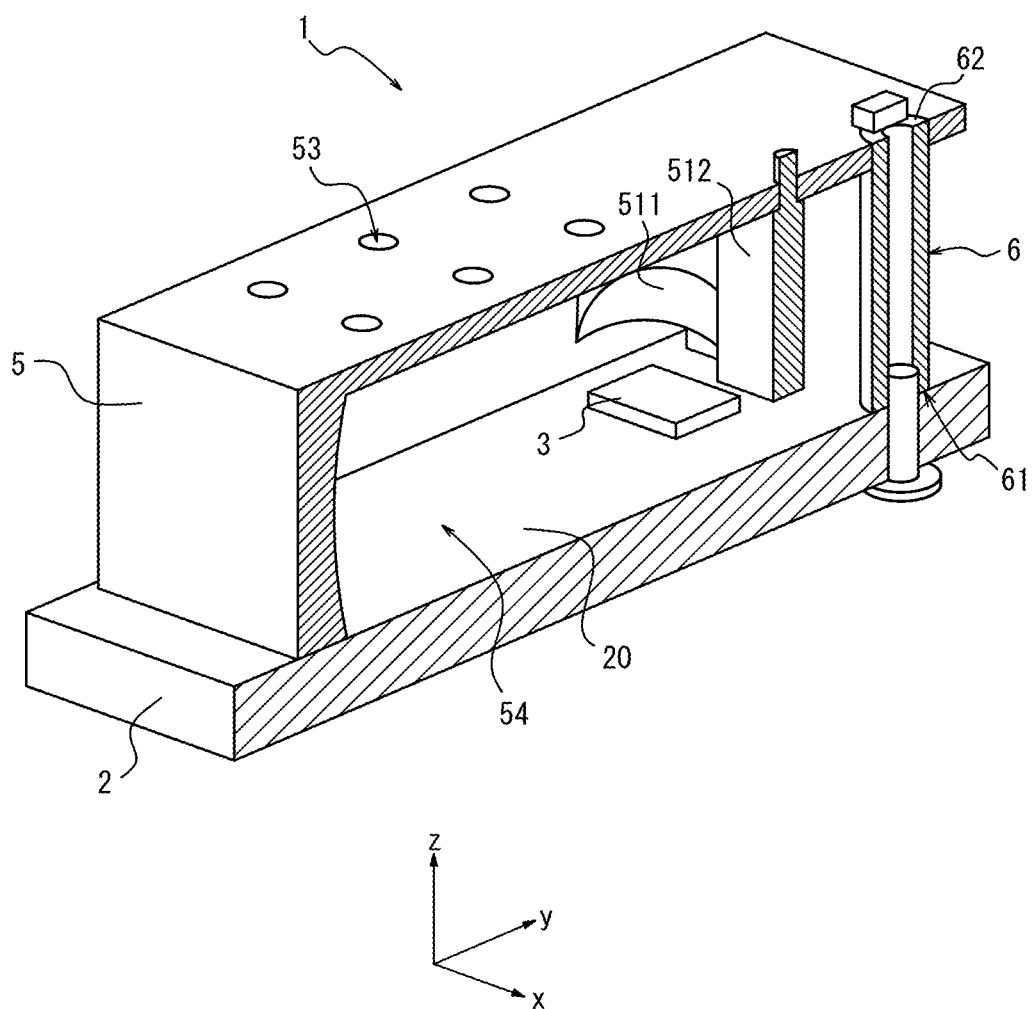
FIG. 2 is a diagram illustrating an example of a cross-section of the gas detection apparatus.

FIG. 2 is a diagram illustrating an example cross-section of the gas detection apparatus 1. FIG. 2 depicts a cross-section where the substrate 2, the light guide member 5 including the third mirror 512, and the joint member 6 are cut along a plane parallel to yz-planes. The cell 54 is defined by the interior of the gas detection apparatus 1 sandwiched between the substrate 2 and the light guide member 5. The light guide member 5 includes vents 53 for introducing a gas into the cell 54. The vents 53 may also be used for discharging the gas from the cell 54. In the present embodiment, the joint member 6 is a hollow columnar body. The first bottom portion 61 is joined to the substrate 2 by inserting a screw from the bottom surface of the substrate 2 into the hollow portion. The second bottom portion 62 is joined to the light guide member 5 by a grommet that extends in the hollow portion after being inserted into the hollow portion. In another example, the joint member 6 may be a solid columnar body. The first bottom portion 61 and the substrate 2, and the second bottom portion 62 and the light guide member 5 may be joined to each other by an adhesive, welding, nails, mating, or the like. The first mirror 511, the main surface 20 of the substrate 2, and the light emitting element 3 in FIG. 2 are the same as the corresponding elements denoted by the same reference symbols in FIG. 1, and a description thereof will thus be omitted.

Figure 3:
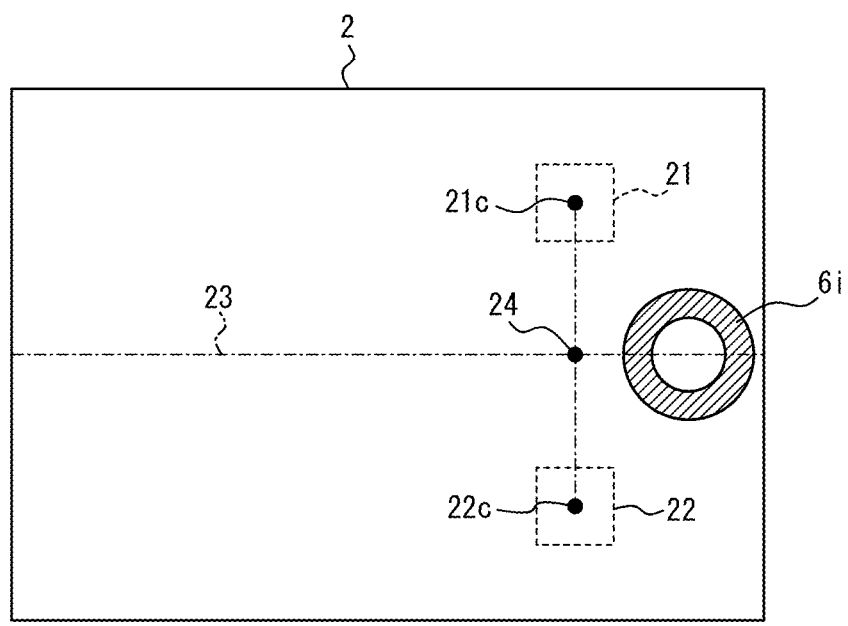
FIG. 3 is a diagram illustrating an example of the disposition and the shape of the joint member.
Figure 3:
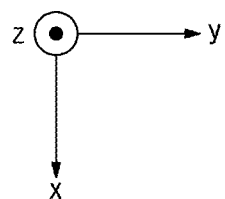

FIG. 3 is a diagram illustrating an example of the disposition and the shape of the joint member 6. In FIG. 3, the main surface 20 of the substrate 2 viewed toward the z-axis negative direction is illustrated. An orthogonal projection image 6i is an image of the joint member 6, where the joint member 6 is projected orthogonally to the main surface 20 of the substrate 2. In the present embodiment, the orthogonal projection image 6i to the main surface 20 of the substrate 2 is hollow circular. In another example where the joint member 6 is a solid columnar body, the orthogonal projection image 6i is solid circular. In FIG. 3, the midpoint 24 of the line segment connecting the center 21c of the first region 2 and the center 22c of the second region 22 is illustrated. In addition, the perpendicular bisector 23 of the line segment connecting the center 21c of the first region 21 and the center 22c of the second region 22 is also illustrated in FIG. 3. In the present embodiment, the joint member 6 is disposed so that the orthogonal projection image 6*i* thereof to the main surface 20 of the substrate 2 is on the perpendicular bisector 23. Here, the orthogonal projection image 6*i* may be a cross-sectional shape of the portion of the joint member 6 directly on the main surface 20 of the substrate 2.

The joint member 6 can be made of a material which has a high elastic modulus and is resistant to deformations. For example, examples of the material of the joint member 6 include hard resins containing a liquid crystal polymer (LCP), polypropylene (PP), polyether ether ketone (PEEK), polyamide (PA), polyphenylene ether (PPE), polycarbonate (PC), polyphenylene sulfide (PPS), a polymethyl methacrylate resin (PMMA), and a polyarylate resin (PAR), and a mixture of two or more of these. The joint member 6 and the light guide member 5 may be made of the same material. When the joint member 6 and the light guide member 5 are made of the same material, no thermal expansion difference is generated to thereby suppress thermal distortions. The substrate 2 and the light guide member 5 are joined only by the joint member 6. Accordingly, even when the substrate 2 deforms due to a thermal expansion, for example, this configuration prevents the light guide member 5 from being affected by the deformation of the substrate 2. The light guide member 5 is connected to the substrate 2 only at the single point. Thus, even when the substrate 2 deforms so as to expand in the y-axis direction, for example, the optical performances of the optical members are not affected because the optical members are similarly reduced (or magnified) around this single point without being distorted.

In addition, when respective different forces act on the substrate 2 and the light guide member 5, the joint member 6 is resistant to deformations in directions along the axes. However, torsional and bending deformations may take place. Hence, the light guide member 5 is not displaced in the z-axis direction relative to the substrate 2. In this case, because the distances (optical path lengths) between the first reflecting portion 51, and the light emitting element 3 and the light receiving element 4 are maintained, the accuracy of the gas detection is maintained. Nevertheless, the light guide member 5 may be rotationally displaced relative to the substrate 2 about the joint member 6 as the rotation axis. Stated differently, the joint member 6 serves as the rotation axis about which the light guide member 5 is displaced relative to the substrate 2. As used herein, the term "displacement", "displace", or "displaced" may mean that the light guide member 5 and the substrate 2 are relatively rotated when the substrate 2 is fixed and a shearing stress parallel to the main surface 20 of the substrate 2 is applied to a side surface of the light guide member 5. Alternatively, the term "displacement", "displace", or "displaced" may refer to a rotation when the substrate 2 is fixed, and an external force is applied to the light guide member 5, from a point on the surface of the light guide member 5 which is farthest from the joint member 6 as the start point, in the direction parallel to the main surface 20 of the substrate 2 and orthogonal to the straight line connecting the start point and the joint member 6.

Figure 4:
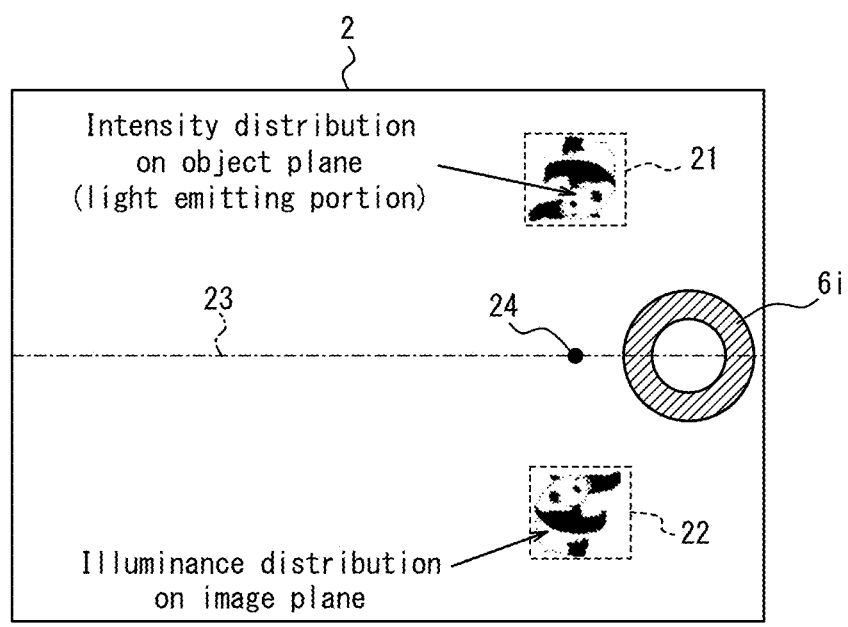
FIG. 4 is a diagram for explaining the intensity distribution on the object plane (light emitting portion) and the illuminance distribution on the image plane.

Here, although a structure which is displaced in a certain direction under an external force in a direction orthogonal or parallel to the main surface 20, but is not displaced in other directions is not regarded as the "joint member 6", because such a structure causes no deformation of the light guide member and does not provide an additional restriction even upon a thermal expansion. In other words, a structure which can be parallelly displaced is not regarded as the joint member 6. As illustrated in FIG. 4, in the case where the joint member 6 is disposed so that the orthogonal projection image 6*i* thereof is on the perpendicular bisector 23, the intensity distribution on the object plane (light emitting portion) and the illuminance distribution on the image plane are point-symmetrical relative to the rotation axis. Accordingly, even if the light guide member 5 is rotationally displaced relative to the substrate 2 (i.e., light emitting portion), the displacement of the illuminance distribution at the light receiving portion produced by the light emitting portion matches the rotational displacement of the light receiving portion in terms of the direction and the amount. Thus, the illuminance distribution of light received by the light receiving surface is not affected and fluctuations of the gas detection sensitivity are suppressed. In this manner, provision of the joint member 6 serving as the rotation axis can achieve a gas detection apparatus of which gas detection sensitivity is resistant to fluctuations. As used herein, the term "object plane" refers to a surface which is in contact with the gas at a light emitting portion of an element and is made of an optically transparent material. The term "image plane" refers to a surface which is in contact with the gas at a light sensitive portion of the element and is made from an optically transparent material.

Figure 22:
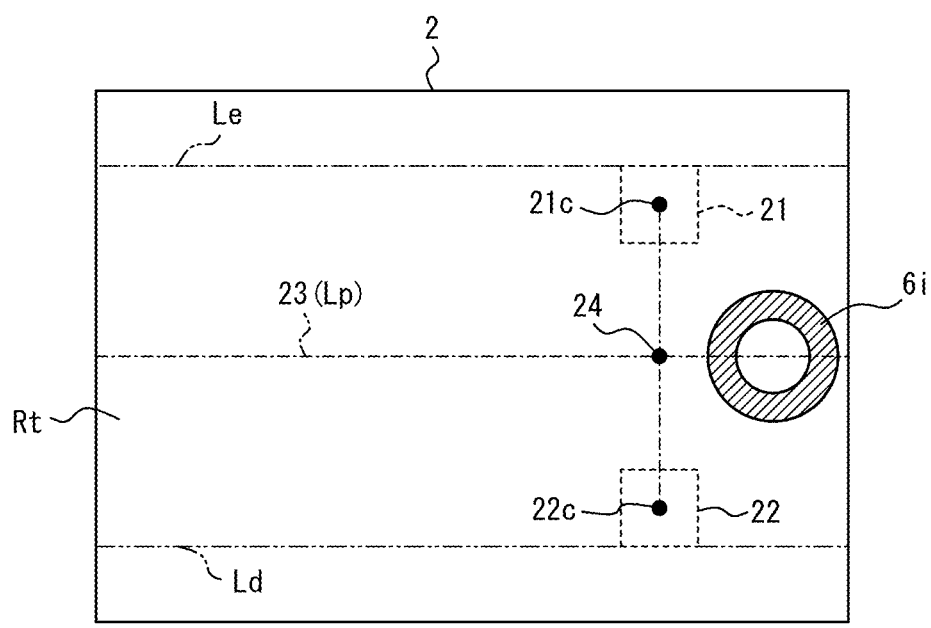
FIG. 22 is a diagram for explaining the disposition of a joint member.
Figure 22:
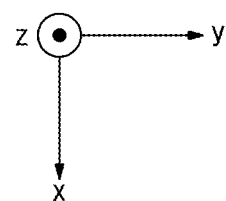

In addition, even if the light guide member 5 is rotationally displaced relative to the substrate 2 (i.e. light emitting portion), the displacement of the illuminance distribution in the light receiving portion produced by the light emitting portion also substantially matches the rotational displacement of the light receiving portion in terms of the direction and the amount as long as the orthogonal projection image of the joint member to the main surface of the substrate is in the region Rt as illustrated in FIG. 22, for the same reason as described above. Here, the straight line Lp is the perpendicular bisector 23 of the line segment connecting the center of the first region 21 and the center of the second region 22. The straight Le is the straight line parallel to the straight line Lp and passing through the first region 21. The straight line Ld is a straight line parallel to the straight line Lp and passing through the second region 22. The region Rt is the largest region in the main surface of the substrate sandwiched between the straight line Le and the straight line Ld.

Figure 5:
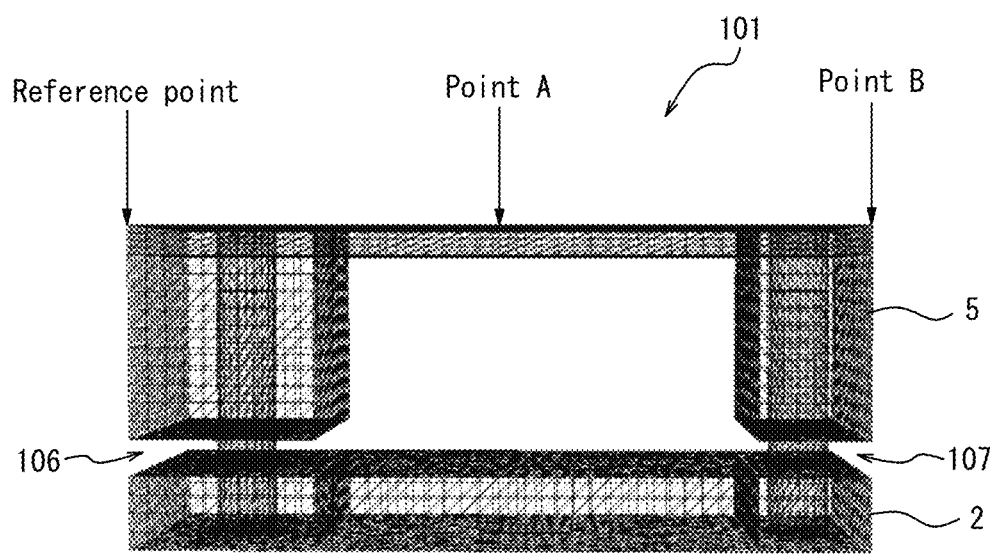
FIG. 5 is a diagram illustrating the shape of a gas detection apparatus of a comparative example before a thermal expansion.
Figure 5:
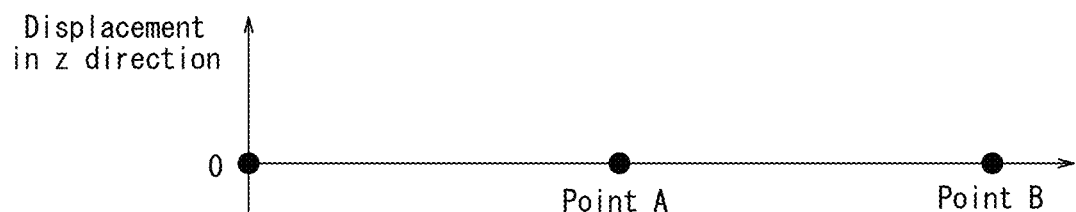
Figure 5:
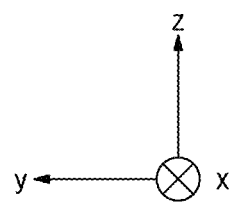
Figure 6:
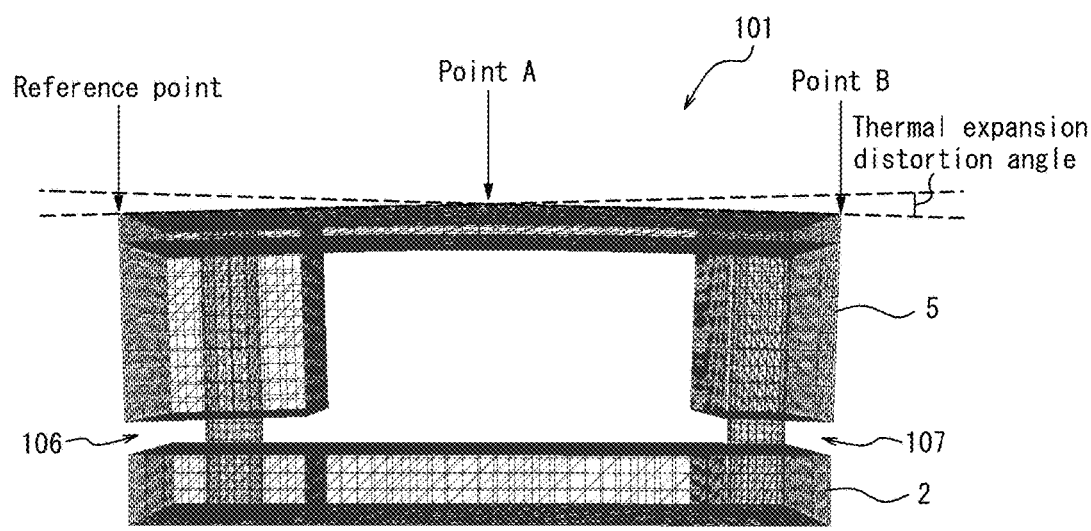
FIG. 6 is a diagram illustrating the shape of the gas detection apparatus of the comparative example after the thermal expansion.
Figure 6:
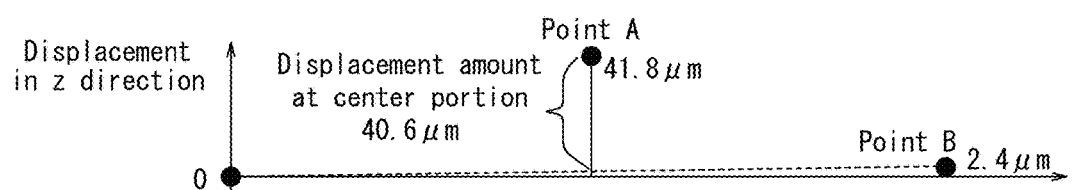
Figure 6:
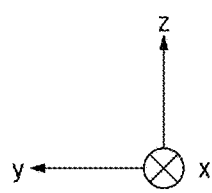
Figure 7:
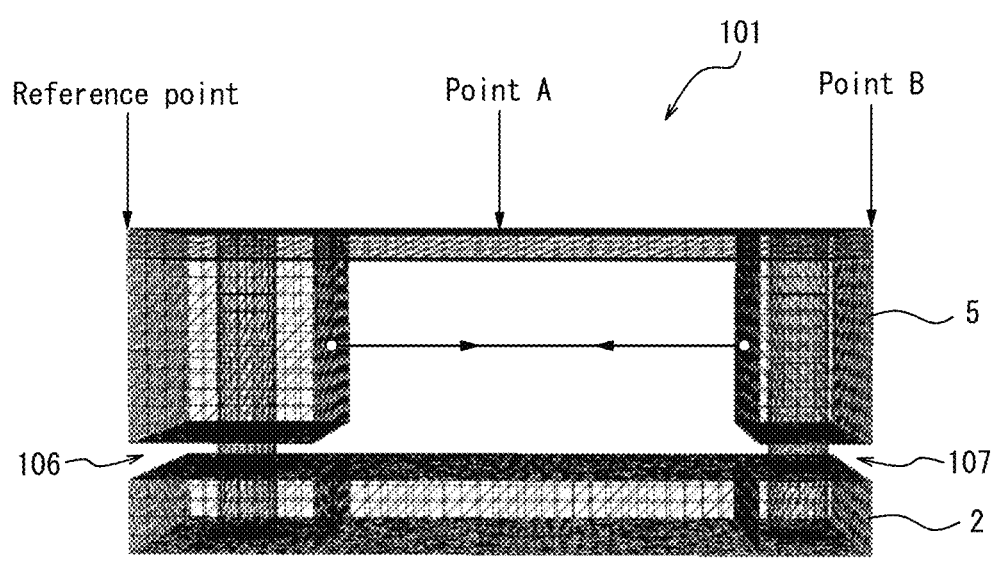
FIG. 7 is a diagram illustrating an optical path in the gas detection apparatus of the comparative example before the thermal expansion.
Figure 7:
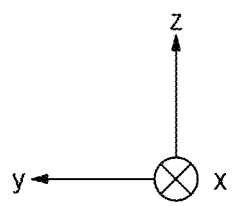
Figure 8:
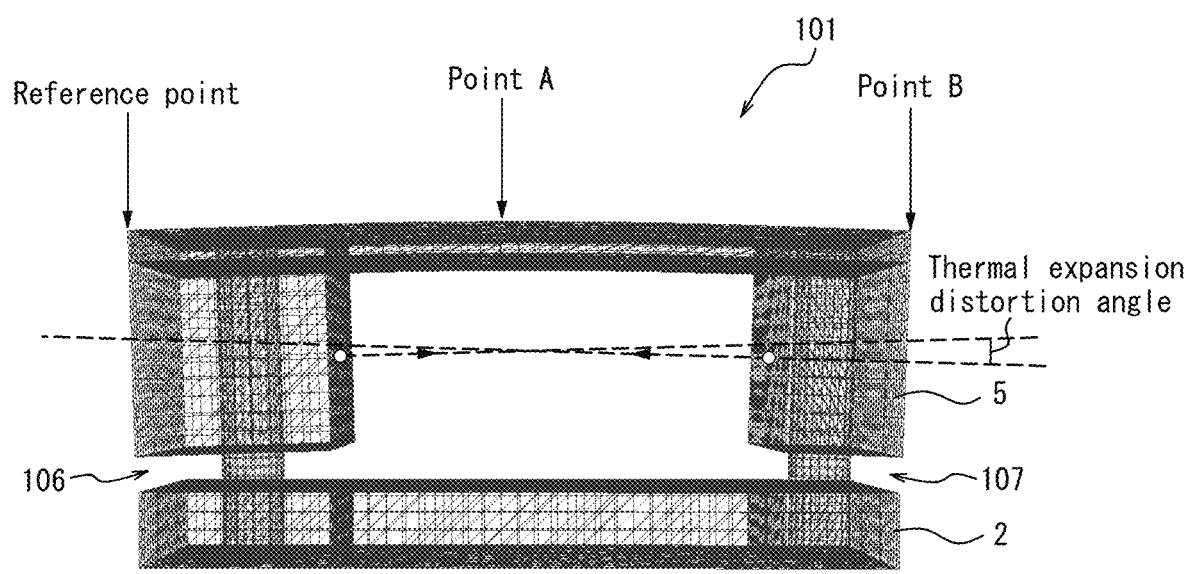
FIG. 8 is a diagram illustrating the optical path in the gas detection apparatus of the comparative example after the thermal expansion.

Here, FIGS. 5 and 6 are diagrams of results of a simulation simulating a deformation caused by a thermal expansion of a gas detection apparatus 101 of a comparative example having a joint member 6 together with a first reflecting portion 51 and a second reflecting portion 52. FIG. 5 illustrates the shape of the gas detection apparatus 101 before the thermal expansion, whereas FIG. 6 illustrates the shape of the gas detection apparatus 101 after the thermal expansion. Similarly to the gas detection apparatus 1 according to the present embodiment, the gas detection apparatus 101 of the comparative example includes a substrate 2 and a light guide member 5. The gas detection apparatus 101 of the comparative example also includes a first joint member 106 and the second joint member 107 for securely joining the substrate 2 and the light guide member 5. Here, in the simulation, the temperature increase was set to 100° C. The material of the light guide member 5 was polycarbonate, and the Young's modulus, the expansion coefficient, and the Poisson ratio of the light guide member 5 were 2.35 GPa, 70 ppm/° C., and 0.38, respectively. The Young's modulus, the expansion coefficient, the Poisson's ratio, the thickness, the long side length, and the short side length of the substrate 2 were 25.0 GPa, 20 ppm/° C., 0.2, 2.0 mm, 20.0 mm, and 10.0 mm, respectively. As illustrated in FIGS. 7 and 8, the center portions of the first reflecting portion 51 and the second reflecting portion 52 were bent due to a thermal expansion deformation, and the relative angle of the second reflecting portion 52 to the first reflecting portion 51 changed. FIG. 7 illustrates the state before the thermal expansion, and FIG. 8 illustrates the state after the thermal expansion. As used herein, the term "thermal expansion distortion angle" refers to the amount of a change in the relative angle before and after a thermal expansion, as illustrated in FIGS. 7 and 8, wherein the relative angle is the angle formed by the normal vectors at an arbitrary representative point on the first reflecting portion 51 and an arbitrary representative point on the second reflecting portion 52. Here, the representative point on the first reflecting portion 51 and the representative point on the second reflecting portion 52 may be selected from points present at positions to maximize the minimum distance, where the minimum distance is defined as the length of the shortest geodetic line among geodetic lines between the geometric center of each surface or each point on the surface outer peripheral portion of each surface of the first reflecting portion 51 or the second reflecting portion 52 and a certain point. As illustrated in FIG. 8, the thermal expansion distorts the optical path, which causes fluctuations of the gas detection sensitivity. In the results of the simulation, in the surface of the light guide member 5 which was farthest from the substrate 2 (this surface is also referred to as the "upper surface"), a displacement of 40.6 µm on average arose at the center of the upper surface from the peripheral end of the upper surface. The thermal expansion distortion angle was 0.73°, and the illuminance distribution on the image plane was displaced by 76.6 µm. Assuming that a typical length of one side of the light emitting element 3 is 1000 µm, 76.6 µm, which was the amount of the displacement of the illuminance distribution on the image plane, was 5% or more of the length of the one side, which would cause significant fluctuations of the characteristics.

Figure 9:
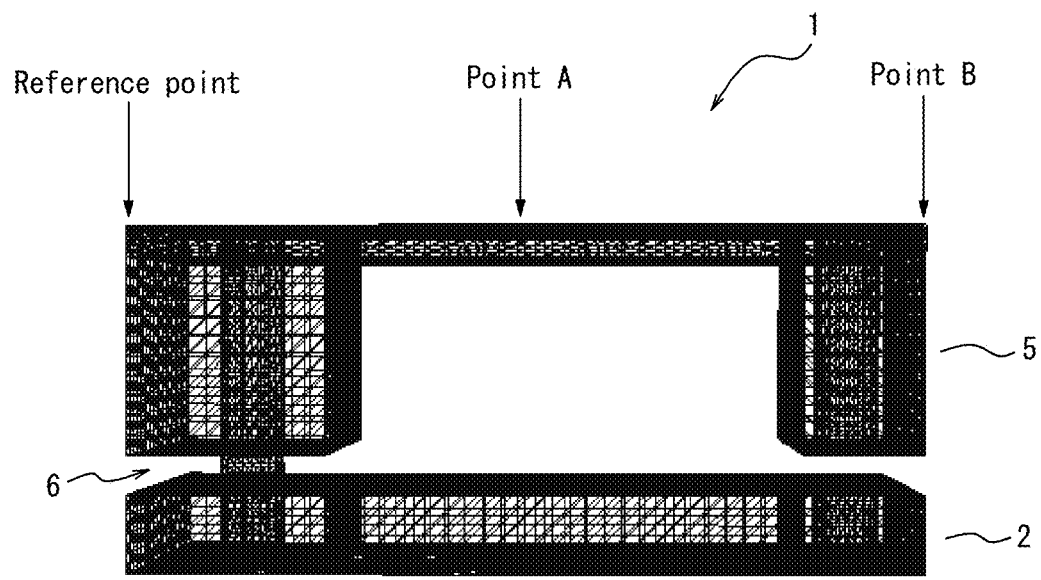
FIG. 9 is a diagram illustrating the shape of a gas detection apparatus according to an embodiment of the present disclosure before a thermal expansion.
Figure 9:
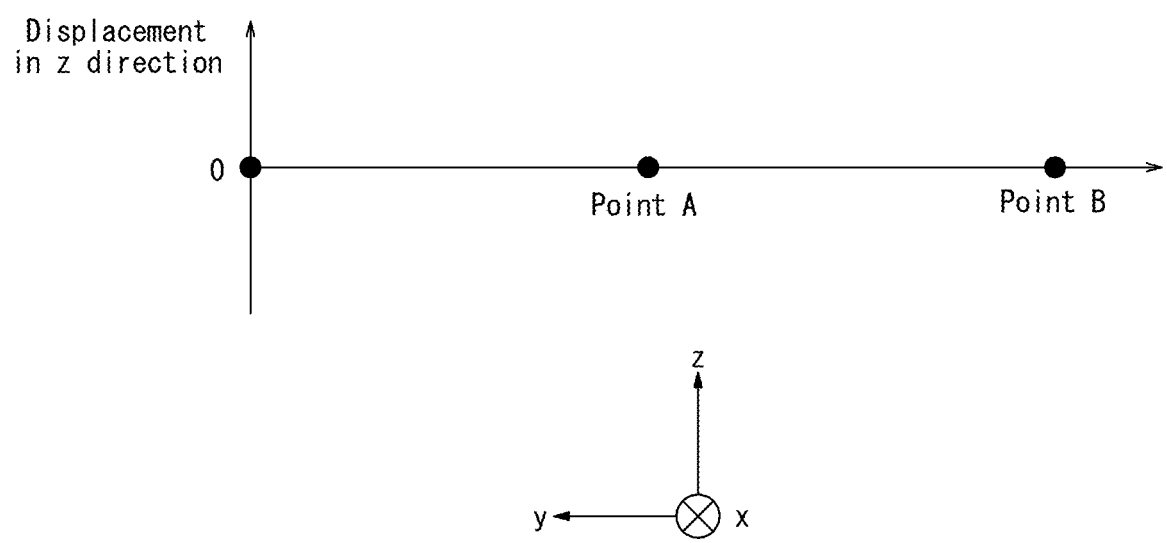
Figure 10:
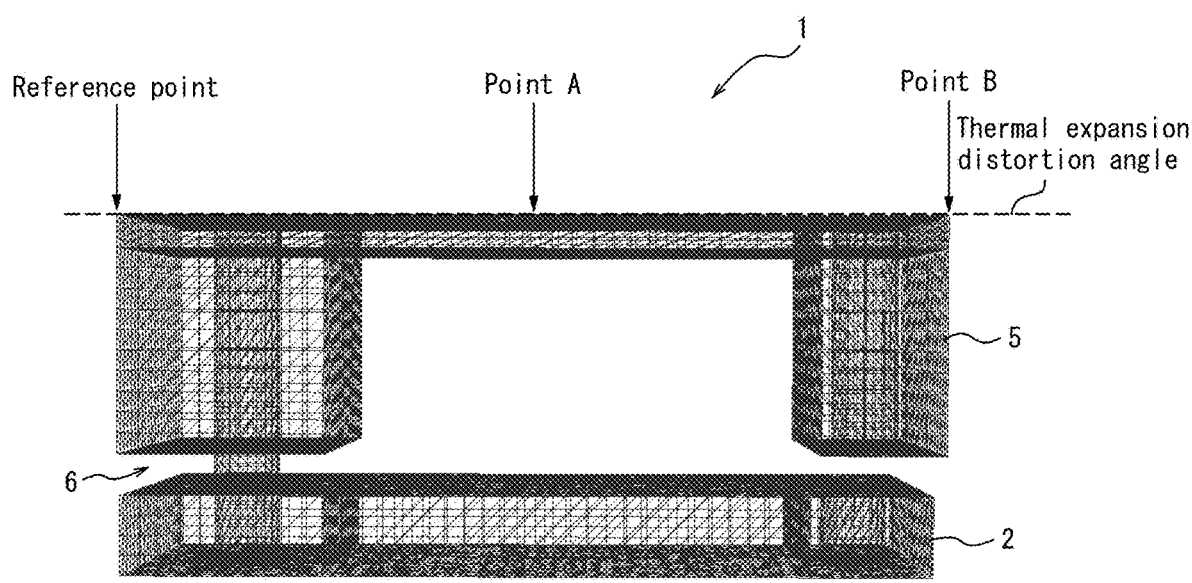
FIG. 10 is a diagram illustrating the shape of the gas detection apparatus according to an embodiment of the present disclosure after the thermal expansion.
Figure 10:
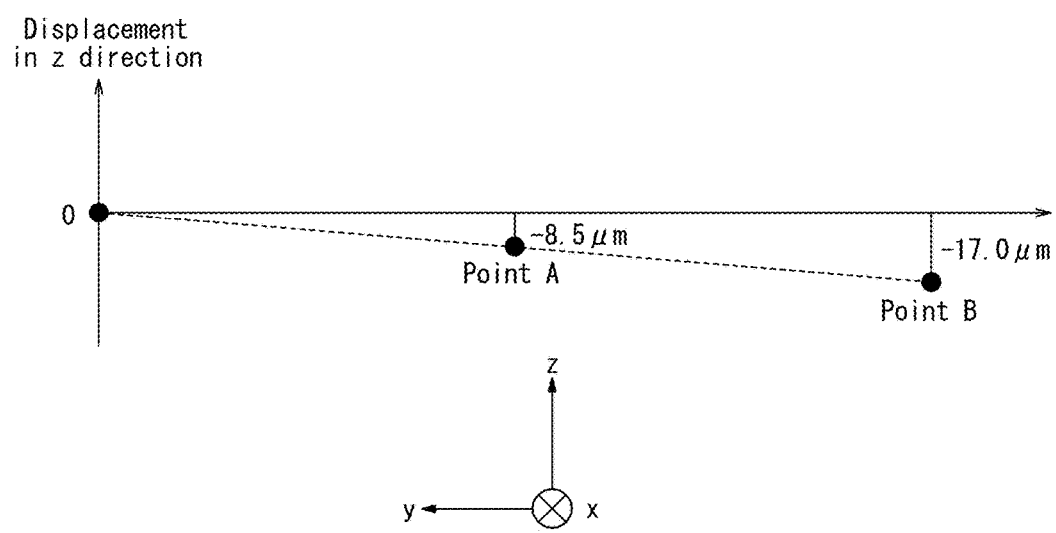

In contrast, FIGS. 9 and 10 are diagrams illustrating a deformation caused by a thermal expansion of the gas detection apparatus 1 having only a single joint member 6 in the light guide member 5. FIG. 9 illustrates the shape of the gas detection apparatus 1 before the thermal expansion, whereas FIG. 10 illustrates the shape of the gas detection apparatus 1 after the thermal expansion. As illustrated in FIGS. 9 and 10, the center portions of the first reflecting portion 51 and the second reflecting portion 52 were not bent by the thermal expansion deformation, and the relative angle of the second reflecting portion 52 to the first reflecting portion 51 did not change. In other words, the deviation at the point B at the end was −17 µm and the deviation at the point A which was the midpoint was −8.5 µm. The thermal expansion distortion angle was thus 0.0°, and the reference point, the point A, and the point B were on the straight line. Accordingly, the optical path was maintained and the gas detection sensitivity would not fluctuate.

Figure 11:
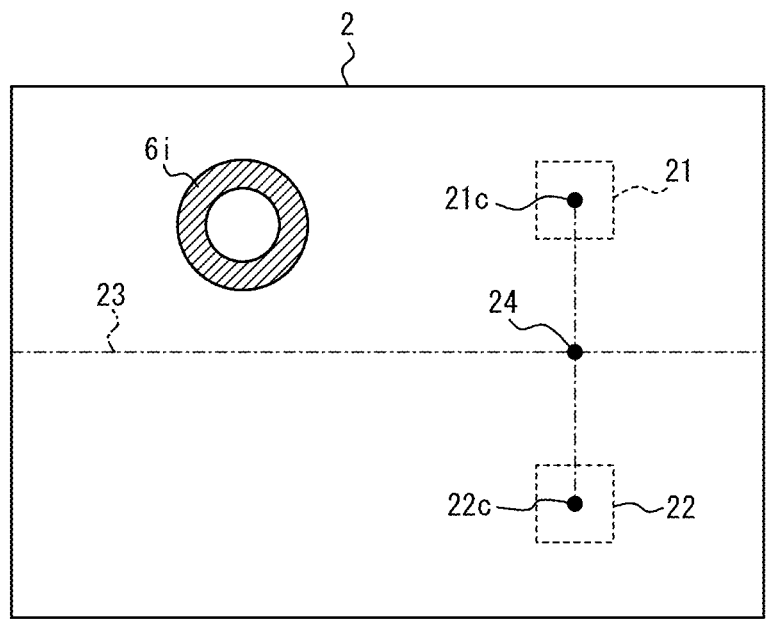
FIG. 11 is a diagram illustrating another example of the disposition of the joint member.
Figure 11:
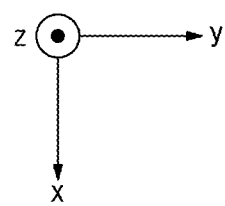

FIG. 11 is a diagram illustrating another example of the disposition of the joint member 6. The elements in FIG. 11 are the same as the corresponding elements denoted by the same reference symbols in FIG. 3, and a description thereof will thus be omitted. As illustrated in FIG. 11, the joint member 6 may be provided at a different position on the main surface 20 of the substrate 2. More specifically, the joint member 6 may be disposed so that the orthogonal projection image 6i thereof to the main surface 20 of the substrate 2 is not on the perpendicular bisector 23. In the y-axis direction, the joint member 6 may be disposed so as to be closer to the second mirror 521 and the fourth mirror 522 than the first mirror 511 and the fifth mirror 513. The light emitting element 3 and the light receiving element 4 still need to face the first reflecting portion 51 for maintaining the optical path as described above. For that purpose, the joint member 6 is preferably provided at the location where the amount of a displacement of the first reflecting portion 51 becomes smaller than the amount of a displacement of the second reflecting portion 52 when the light guide member 5 is displaced relative to the substrate 2. In other words, the joint member 6 serving as the rotation axis is preferably provided so as to be closer to the first reflecting portion 51 than the second reflecting portion 52. Specifically, the orthogonal projection image 6i of the joint member 6 is preferably close to the midpoint 24.

As described above, the above configuration of the gas detection apparatus 1 according to the present embodiment prevents the light guide member 5 from being affected by a deformation of the substrate 2 caused by a thermal expansion. Accordingly, distortion of the optical path and degradation of the sensitivity can be suppressed in the gas detection apparatus 1.

In addition, the optical members provided in the light guide member 5 are fixed to the substrate 2 via the joint member 6. Therefore, it is possible to suppress degradation of optical properties which would be caused by distortions of the optical members if the optical members are directly joined to the substrate 2.

Further, in case of respective different forces acting on the substrate 2 and the light guide member 5 in the gas detection apparatus 1, the light guide member 5 is rotationally displaced about the joint member 6 as the rotation axis. Therefore, provision of the joint member 6 to a position where the amount of a displacement relative to the first reflecting portion 51 becomes smaller than the amount of a displacement of the second reflecting portion 52 can reduce an influence on the optical path.

In addition, because the gas detection apparatus 1 is configured so that the orthogonal projection image 6i to the main surface 20 of the substrate 2 is on the perpendicular bisector of the line connecting the center of the first region 21 and the center of the second region 22, the longest distance from the joint member 6 to the side of the substrate 2 extending the y-axis direction is minimized. As a result, the bending stiffness of the gas detection apparatus 1 is increased, and an influence on the optical path caused by vibrations of the substrate 2 can be further suppressed. In addition, in case of a deformation of the substrate 2 caused by a thermal expansion, the deformation is symmetrical to the above-described perpendicular bisector. Here, as illustrated in FIG. 4, the illuminance distribution on the image plane has an approximate 180° rotational relationship with the intensity distribution on the object plane (light emitting portion). Because a displacement of the illuminance distribution on the image plane caused by a displacement of the intensity distribution on the object plane matches the displacement of the image plane, the illuminance distribution on the image plane is not affected. As a result, fluctuations of the gas detection sensitivity are suppressed.

Second Embodiment

Figure 12:
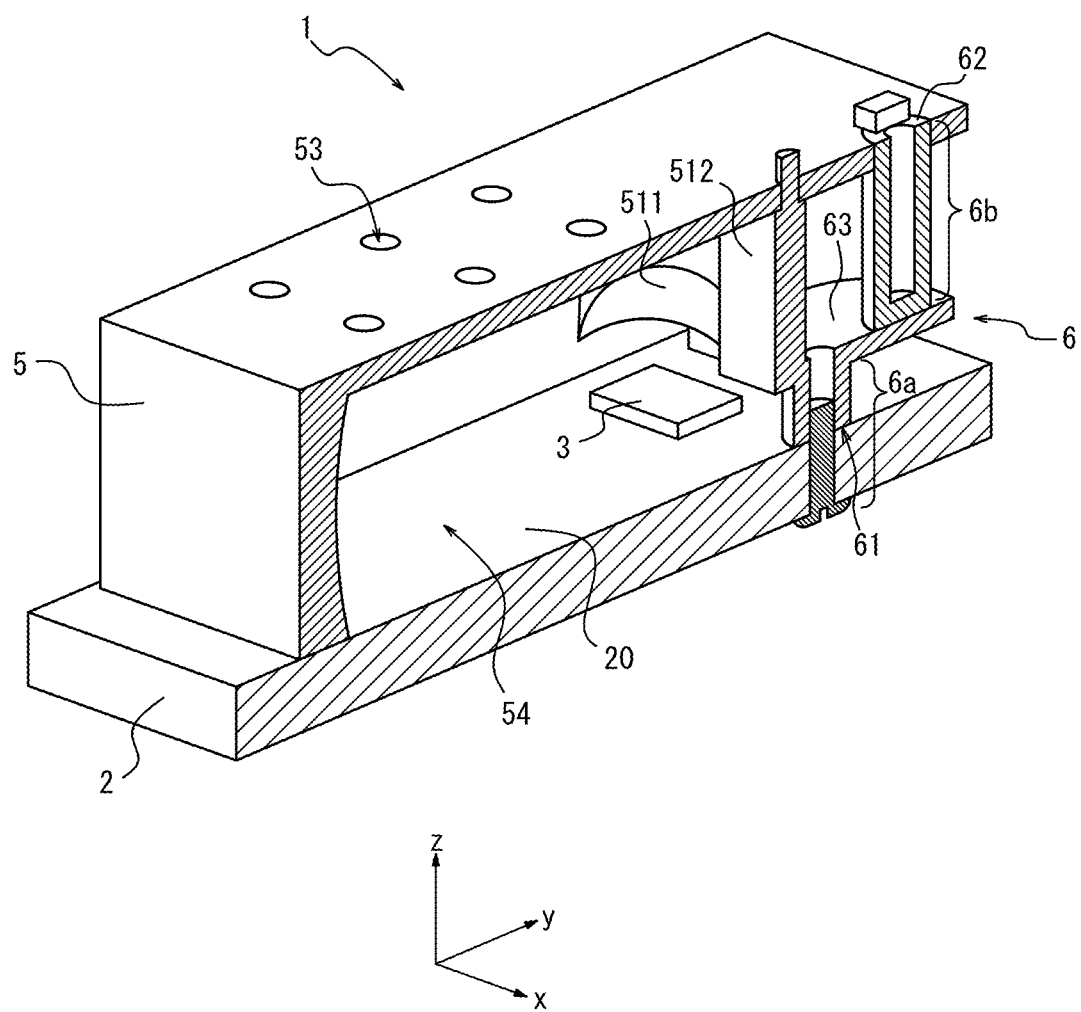
FIG. 12 is a diagram illustrating another example of a cross-section of a gas detection apparatus.

FIG. 12 is a drawing illustrating an example of a cross-section of a gas detection apparatus according to another embodiment of the present disclosure. The gas detection apparatus 1 according to the present embodiment has a different configuration of the joint member 6 from than that of the gas detection apparatus 1 according to the first embodiment described above. Other components are the same as the corresponding components in the gas detection apparatus 1 according to the first embodiment. For example, a perspective view of the gas detection apparatus 1 according to the present embodiment is illustrated in FIG. 1 as in the first embodiment. In addition, the components that are the same as those in the gas detection apparatus 1 according to the first embodiment are denoted by the same reference symbols used in FIGS. 1 to 3, and a detailed description thereof will be omitted.

As illustrated in FIG. 12, the joint member 6 in the present embodiment is not a columnar body. The joint member 6 includes a first portion 6a including a first bottom portion 61, a second portion 6b including a second bottom portion 62, and a coupling portion 63 which couples the first portion 6a, the second portion 6b, and the third mirror 512. The third mirror 512 is coupled to the joint member 6. As a result, the relative position of the first reflecting portion 51 to the second reflecting portion 52 is fixed further securely.

Figure 13:
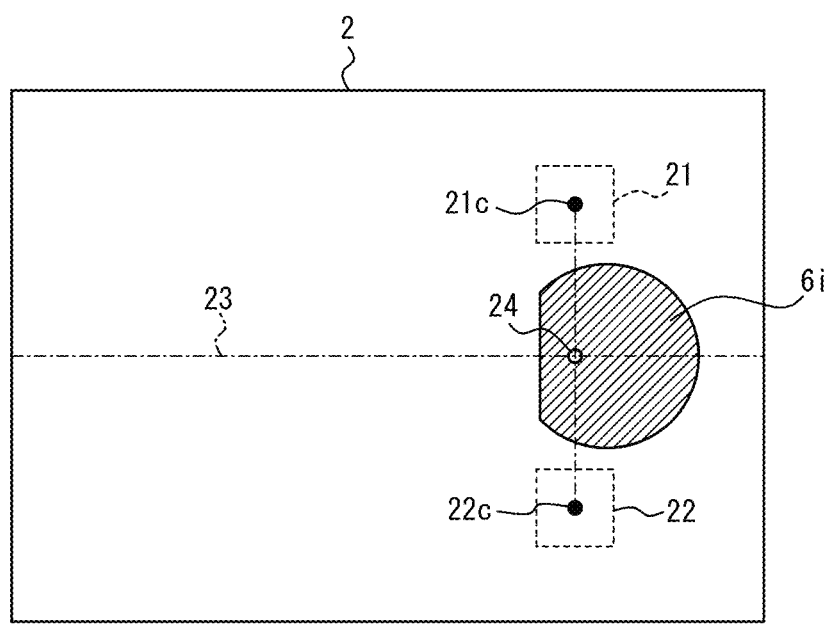
FIG. 13 is a diagram illustrating another example of the disposition and the shape of the joint member.
Figure 13:
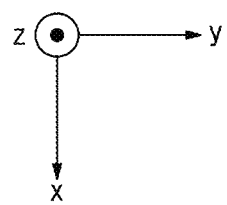

FIG. 13 is in the present embodiment is a diagram illustrating an example of the disposition and the shape of the joint member 6. In FIG. 13, the main surface 20 of the substrate 2 viewed toward the z-axis negative direction is illustrated. In the present embodiment, the orthogonal projection image 6i to the main surface 20 of the substrate 2 is arcuate. The joint member 6 is disposed so that the orthogonal projection image 6i thereof to the main surface 20 of the substrate 2 encompasses the midpoint 24 of the line segment connecting the center 21c of the first region 21 and the center 22c of the second region 22. As described above, disposing the orthogonal projection image 6i of the joint member 6 so as to be close to the midpoint 24 contributes to reduce the amount of a displacement of the first reflecting portion 51 so as to be smaller than the amount of a displacement of the second reflecting portion 52, thereby maintaining the optical path.

As described above, the above configuration of the gas detection apparatus 1 according to the present embodiment provides the same effects as those of the first embodiment. In addition, because the gas detection apparatus 1 according to the present embodiment also includes the joint member 6 having the coupling portion 63 for additionally coupling the third mirror 512, the relative position of the first reflecting portion 51 to the second reflecting portion 52 can be fixed further securely.

Modifications

Although the embodiments have been described with reference to the drawings and the examples, it should be noted that various modifications and variations can be readily conceived of by a person skilled in the art based on the present disclosure. It should be understood that such modifications and variations are encompassed within the scope of the present disclosure. For example, the members, the functions included in each means, or the like can be rearranged unless they are logically contradicted, and a plurality of means, and the like can be combined into one or means can be divided, for example.

Figure 14:
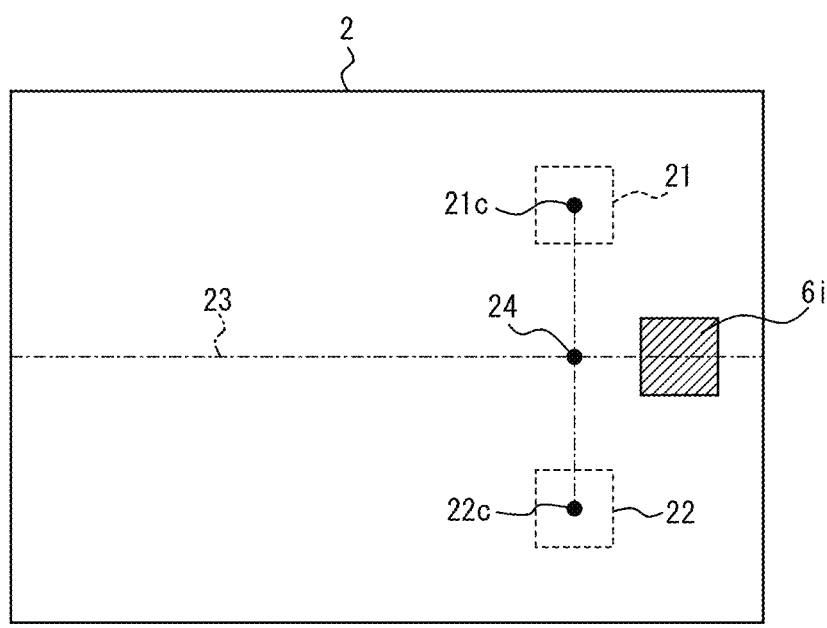
FIG. 14 is a diagram illustrating another example of the shape of the joint member.
Figure 14:
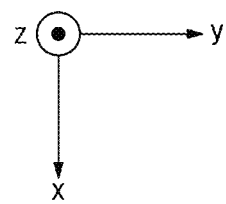

For example, the orthogonal projection image 6i of the joint member 6 may be polygonal. In one modification, as illustrated in FIG. 14, the orthogonal projection image 6i is quadrangular and the joint member 6 may be a quadrangular prism.

Figure 15:
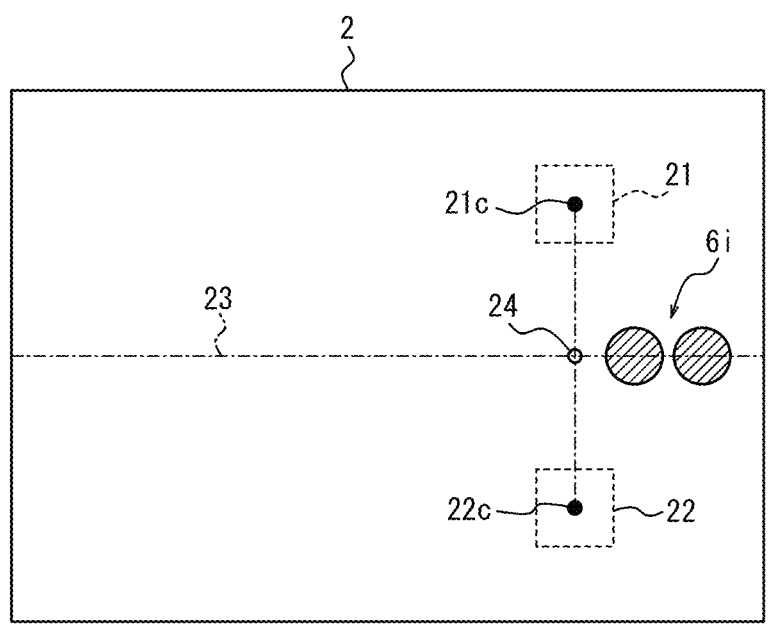
FIG. 15 is a diagram illustrating another example of the shape of the joint member.
Figure 15:
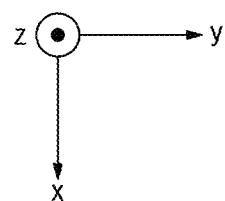

For example, the above embodiments have been described that the joint member 6 is composed of a single part. The joint member 6 may be composed of a plurality of parts. Here, the plurality of parts are separated from each other but are disposed to be close to each other to some extent so that they collectively serve as the rotation axis when the light guide member 5 is displaced relative to the substrate 2. In one modification, the orthogonal projection image 6i may have a plurality of solid circles, as illustrated in FIG. 15. In this configuration, the joint member 6 can join the substrate 2 and the light guide member 5 more securely.

Figure 16:
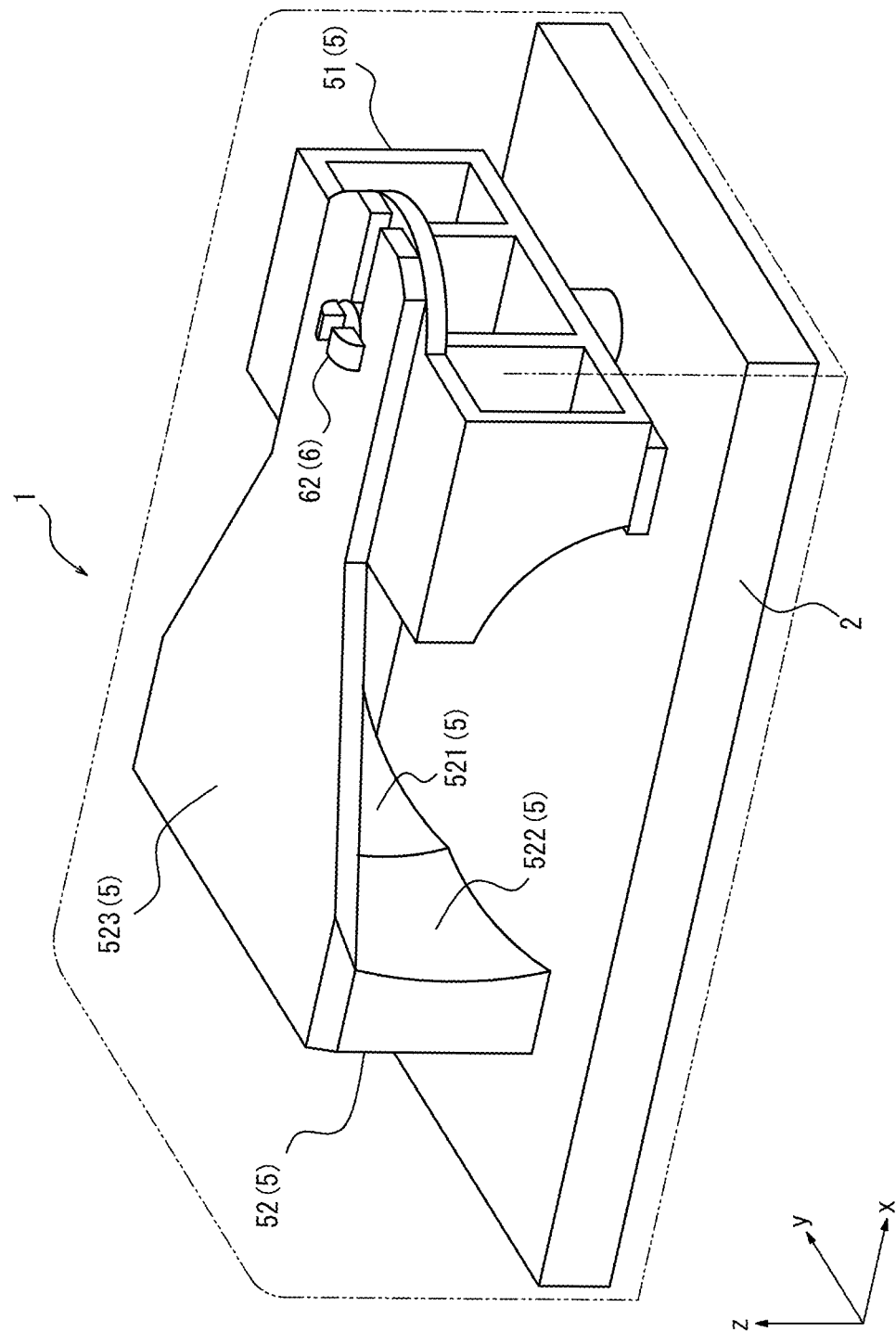
FIG. 16 is a diagram illustrating another example configuration of the light guide member.

For example, the above embodiments have been described that the relative position of the first reflecting portion 51 to the second reflecting portion 52 is fixed by monolithic molding, an adhesive, or the like. In one modification, as illustrated in FIG. 16, the second reflecting portion 52 may be securely joined to the second bottom portion 62 of the joint member 6 together with the first reflecting portion 51 by an adhesive, welding, nails, mating, or the like. In this configuration, the second reflecting portion 52 may include an extension portion 523 which is molded monolithically with the second mirror 521 and the fourth mirror 522, and extends to the first reflecting portion 51.

Figure 17:
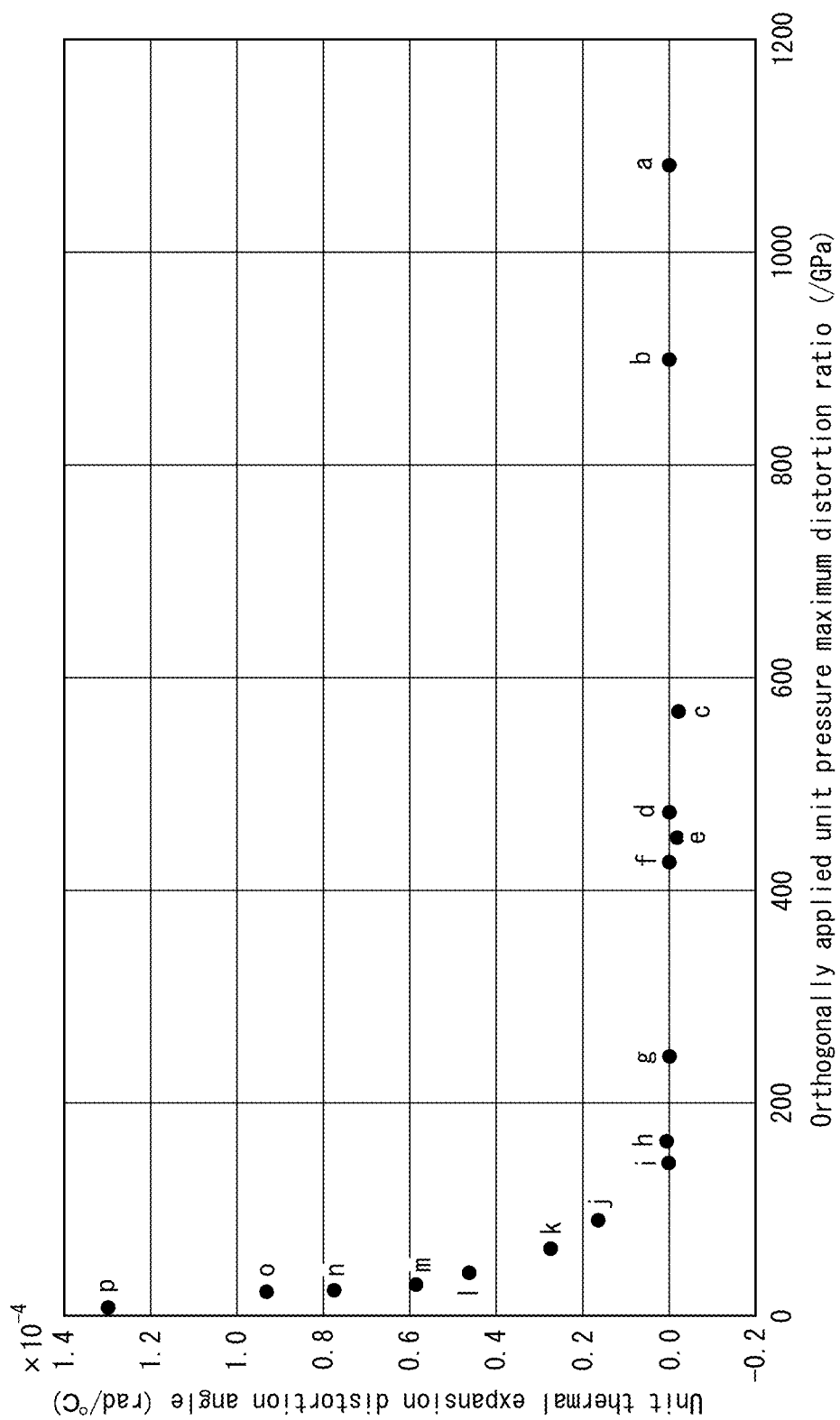
FIG. 17 is a diagram illustrating the relationship between the unit thermal expansion distortion angle and the orthogonally applied unit pressure maximum distortion ratio.
Figure 18:
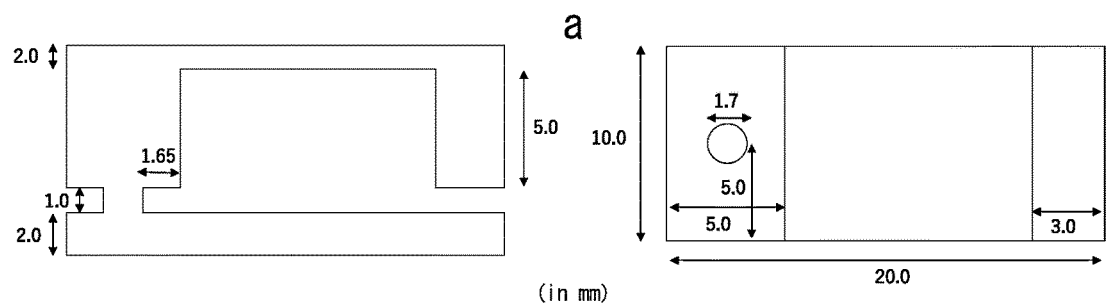
FIG. 18 is a diagram illustrating the shapes of some gas detection apparatuses used in the simulations in FIG. 17.
Figure 18:
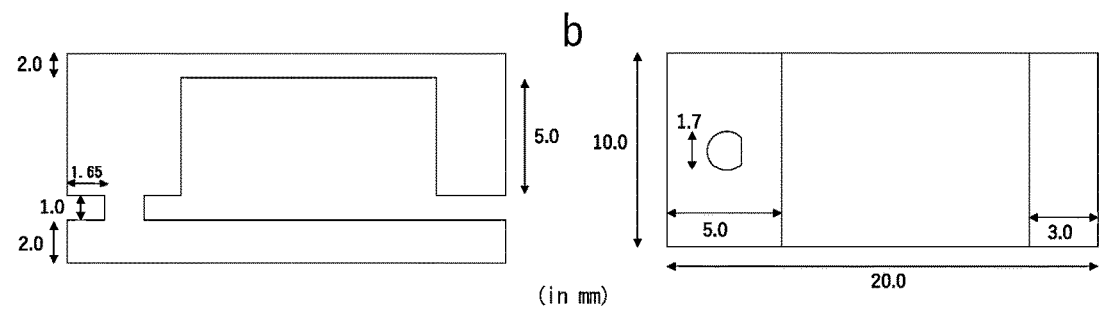
Figure 18:
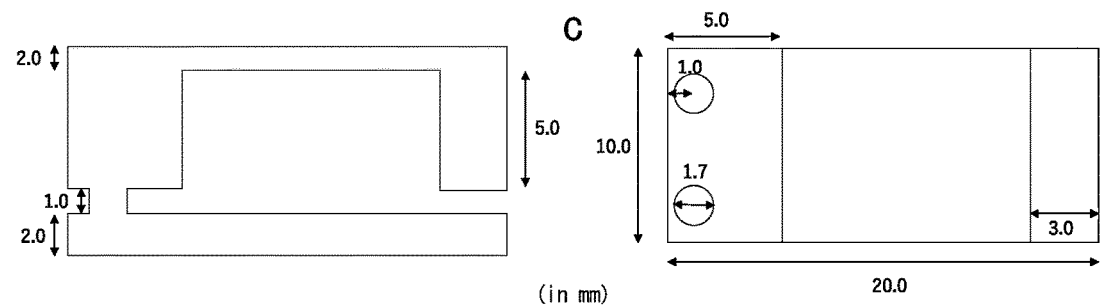
Figure 18:
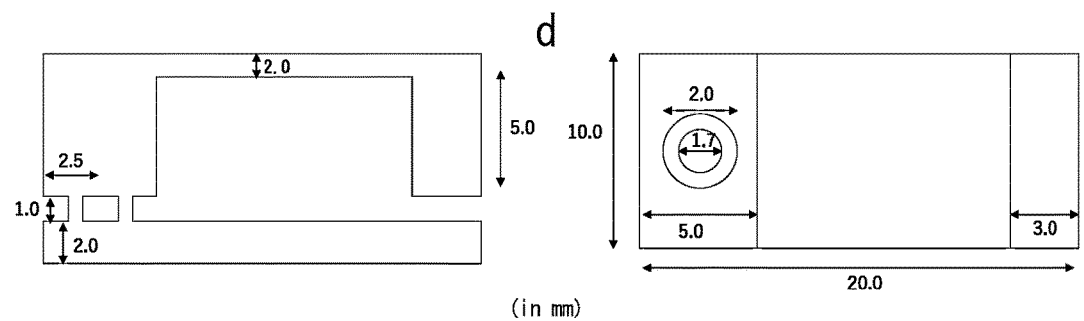
Figure 19:
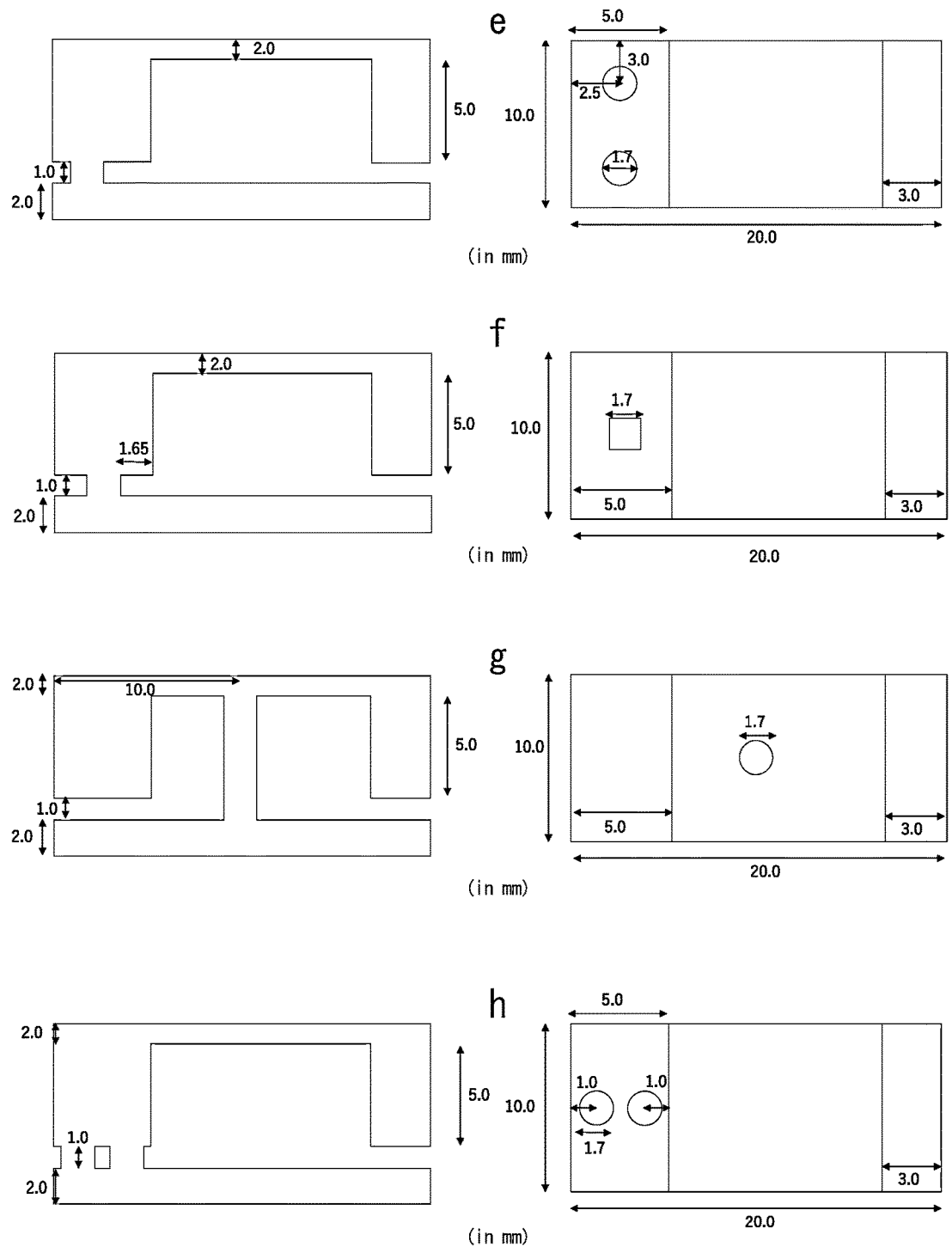
FIG. 19 is a diagram illustrating the shapes of some gas detection apparatuses used in the simulations in FIG. 17.
Figure 20:
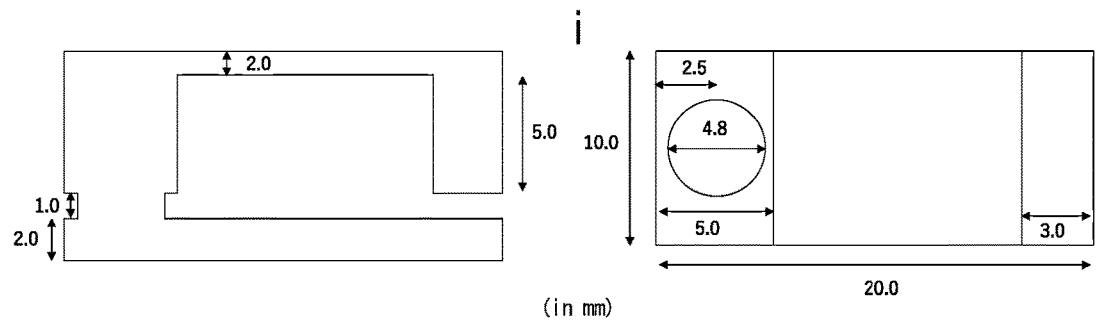
FIG. 20 is a diagram illustrating the shapes of some gas detection apparatuses used in the simulations in FIG. 17.
Figure 20:
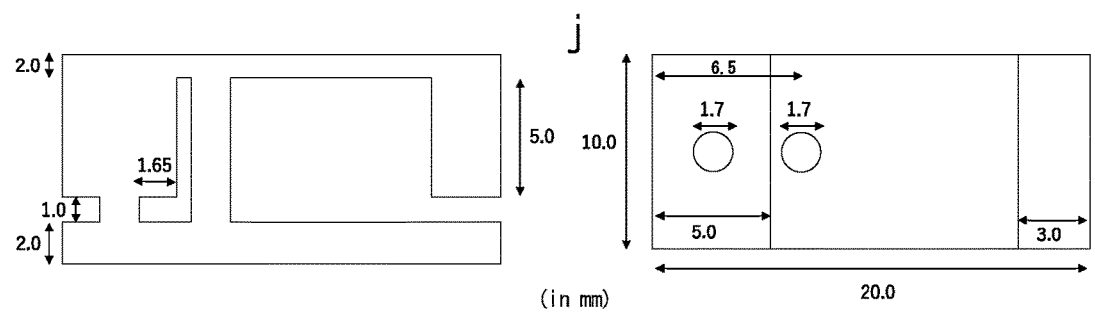
Figure 20:
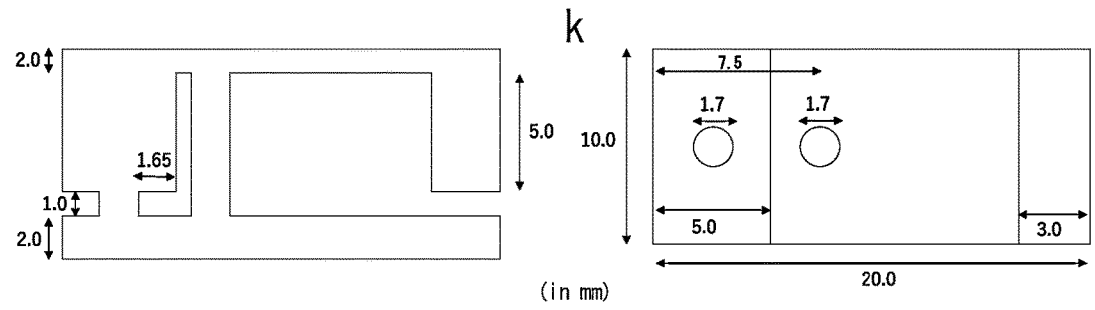
Figure 20:
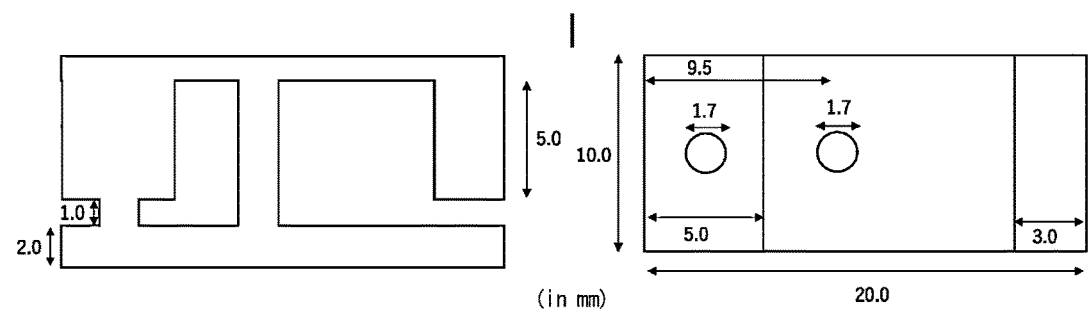
Figure 21:
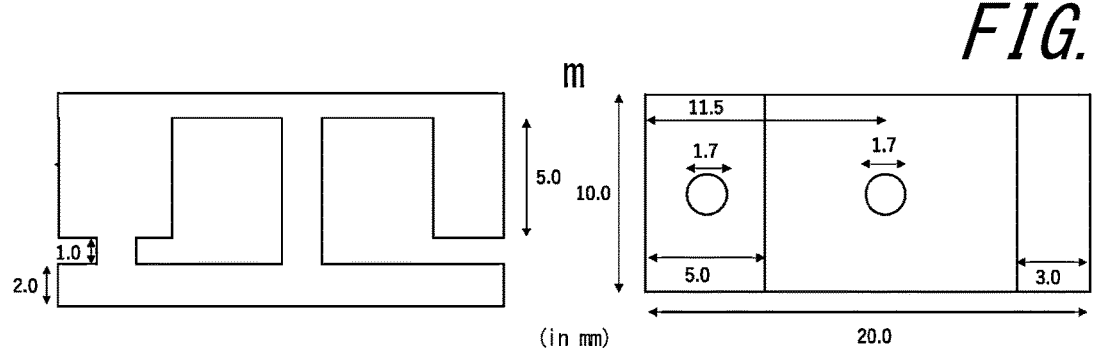
FIG. 21 is a diagram illustrating the shapes of some gas detection apparatuses used in the simulations in FIG. 17.
Figure 21:
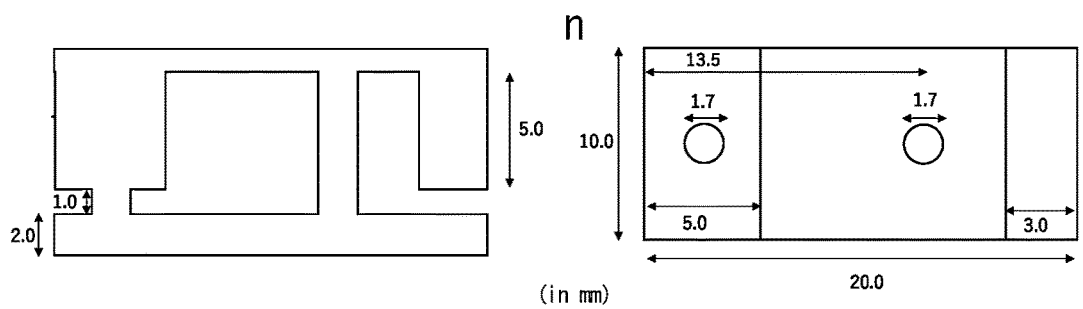
Figure 21:
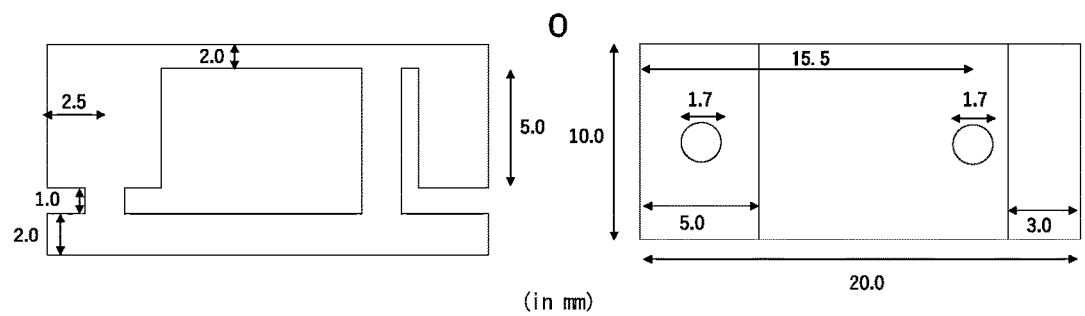
Figure 21:
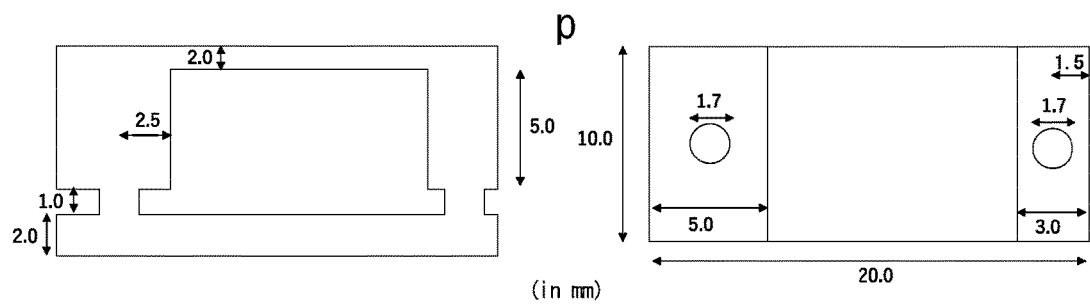

FIG. 17 is a graph of the unit thermal expansion distortion angle versus the orthogonally applied unit pressure maximum distortion ratio in a plurality of examples employing joint members 6 in various shapes, based on simulation results of the thermal expansion distortion angle and the orthogonally applied maximum distortion amount of the light guide member 5.

As used herein, the term "orthogonally applied maximum distortion amount" refers to, when a stress of 5000 Pa is applied orthogonally to the entire upper surface of the light guide member 5 while a part of the substrate 2 is restricted for preventing displacements thereof, the maximum distortion length of the light guide member 5 in the application direction.

From the viewpoint of structural mechanics, the orthogonally applied maximum distortion amount increases linearly and behaves substantially similar to the maximum length of the light guide member 5. The "orthogonally applied unit pressure maximum distortion ratio" is determined by dividing the orthogonally applied maximum distortion amount per unit pressure by the maximum length of the light guide member 5. In the simulations, the orthogonally applied maximum distortion amount per unit pressure was the orthogonally applied maximum distortion amount/5000 Pa. Further, in the simulations, the maximum length of the light guide member 5 was $22.9 \times 10^{-3}$ m. When the joint member 6 is securely joined to the substrate 2 and the light guide member 5 by increasing the area or points to be joined, etc., the rigidity of the structure of the gas detection apparatus 1 as a whole improves. As a result, the orthogonally applied unit pressure maximum distortion ratio is reduced. Stated differently, the orthogonally applied unit pressure maximum distortion ratio is an indicator of the degree of joint between the substrate 2 and the light guide member 5. A smaller value of the orthogonally applied unit pressure maximum distortion ratio corresponds to an excessively restricted state where the substrate 2 and the light guide member 5 are securely joined. A greater value of the orthogonally applied unit pressure maximum distortion ratio corresponds to a smaller restriction state.

As described above, the thermal expansion distortion angle is the relative angle of the second reflecting portion 52 to the first reflecting portion 51. Each unit thermal expansion distortion angle plotted in FIG. 17 is an angle of the thermal expansion distortion angle per 1° C. The unit thermal expansion distortion angle is the amount of an angular change per 1° C. when the thermal expansion distortion angle caused by a temperature increase of 100° C. is determined, assuming that the state before the thermal expansion is 0°. These simulation results indicate that the unit thermal expansion distortion angle increased abruptly in the structures having an orthogonally applied unit pressure maximum distortion ratio of smaller than 143/GPa. Accordingly, the joint member 6 having an orthogonally applied unit pressure maximum distortion ratio of 143/GPa or more can suppress a thermal expansion distortion to thereby maintain the optical path. As a result, the gas detection apparatus 1 without fluctuations of the gas detection sensitivity can be achieved. In FIG. 17, the value of 143/GPa is present between the points of Examples i and j. In other words, when the orthogonally applied unit pressure maximum distortion ratio is 143/GPa or more, the joint member 6 can serve as a rotation axis when the light guide member is displaced relative to the substrate.

The orthogonally applied unit pressure maximum distortion ratio may exceed 10000/GPa if the joint member 6 is only provided to the first reflecting portion 51 and the joint member 6 is very thin and has a very small area so that the joint of the substrate 2 and the light guide member 5 is weak, for example. In this case, when a pressure of 5000 Pa is orthogonally applied to the upper surface having an area of 200 mm², the orthogonally applied maximum distortion amount may be 5.0% of the maximum length of the light guide member 5. For example, suppose that the maximum length of the light guide member 5 is 22.9 mm, the distortion amount is 1.15 mm. The deformation causes the light guide member 5 and the substrate 2 to contact to each other at locations other than the joint member 6, which generates a distortion of the relative angle between the first reflecting portion 51 and the second reflecting portion 52. This leads to a thermal expansion distortion angle, causing a displacement of the optical path, resulting in fluctuations of the gas detection sensitivity. Here, the orthogonally applied unit pressure maximum distortion ratio can be calculated and determined experimentally by fixing the substrate 2 of the gas detection apparatus 1, applying an arbitrary load to the upper surface, measuring the distortion displacement amount by a displacement meter, and determining the value of the average orthogonal stress per upper area from the load. The unit thermal expansion distortion angles of Examples a-p in FIG. 17 were calculated from the simulations of the gas detection apparatuses 1 having the structures illustrated in FIGS. 18-21. In FIGS. 18-21, Examples a-p correspond to the letters used in FIG. 17. In FIGS. 18 to 21, next to the letters "a" to "p", side views are illustrated on the left sides, and top views are illustrated on the right sides.

The invention claimed is:

1. A gas detection apparatus comprising:
a substrate;
a light emitting element provided in a first region in a main surface of the substrate for emitting light;
a light receiving element provided in a second region in the main surface of the substrate for receiving the light;
a light guide member for guiding the light emitted by the light emitting element to the light receiving element; and
a joint member joining the substrate and the light guide member, the joint member serving as a rotation axis when the light guide member is displaced relative to the substrate;
wherein an orthogonal projection image of the joint member to the main surface of the substrate is present in a region Rt, the region Rt being the largest region in the main surface of the substrate sandwiched between a straight line Le and a straight line Ld, where a straight line Lp is a perpendicular bisector of a line segment connecting a center of the first region and a center of the second region, the straight line Le is a straight line parallel to the straight line Lp and passing through the first region, and the straight line Ld is a straight line parallel to the straight line Lp and passing through the second region.

2. The gas detection apparatus according to claim 1, wherein the orthogonal projection image of the joint member to the main surface of the substrate is on the straight line Lp.

3. The gas detection apparatus according to claim 2, wherein the joint member is disposed so that the orthogonal projection image of the joint member to the main surface of the substrate encompasses a midpoint of a line segment connecting the center of the first region and the center of the second region.

4. The gas detection apparatus according to claim 1, wherein the light guide member comprises a first reflecting portion and a second reflecting portion.

5. The gas detection apparatus according to claim 4, a relative position of the first reflecting portion to the second reflecting portion is fixed.

6. The gas detection apparatus according to claim 4, wherein
the first reflecting portion directly reflects the light emitted by the light emitting element and the light to be received by the light receiving element, and
the second reflecting portion reflects the light to and from the first reflecting portion.

7. The gas detection apparatus according to claim 6, wherein the joint member is disposed at a position where an amount of a displacement of the first reflecting portion is smaller than an amount of a displacement of the second reflecting portion upon the displacement of the light guide member relative to the substrate.

8. The gas detection apparatus according to claim 1, wherein the joint member is composed of a plurality of parts.

9. The gas detection apparatus according to claim 1, wherein the joint member is composed of a single part.

10. The gas detection apparatus according to claim 1, wherein the joint member serves as a rotational axis upon a relative rotation of the light guide member and the substrate when the substrate is fixed and a shearing stress parallel to the main surface of the substrate is applied to a side surface of the light guide member.

11. The gas detection apparatus according to claim 1, wherein the joint member serves as a rotational axis when the substrate is fixed and an external force is applied to the light guide member, from a point on a surface of the light guide member which is farthest from the joint member as a start point, in a direction parallel to the main surface of the substrate and orthogonal to a straight line connecting the start point and the joint member.

12. A gas detection apparatus comprising:
a substrate comprising a light emitting element for emitting light and a light receiving element for receiving the light, the light emitting element and the light receiving element being provided on a main surface of the substrate;
a light guide member for guiding the light emitted by the light emitting element to the light receiving element; and
a joint member which is a columnar body and comprises a first bottom portion joining to the substrate and a second bottom portion joining to the light guide member,
the substrate and the light guide member being joined only by the joint member;
wherein an orthogonal projection image of the joint member to the main surface of the substrate is present in a region Rt, the region Rt being the largest region in the main surface of the substrate sandwiched between a straight line Le and a straight line Ld, where a straight line Lp is a perpendicular bisector of a line segment connecting a center of the first region and a center of the second region, the straight line Le is a straight line parallel to the straight line Lp and passing through the first region, and the straight line Ld is a straight line parallel to the straight line Lp and passing through the second region.

13. A gas detection apparatus comprising:
a substrate;
a light emitting element provided in a first region in a main surface of the substrate for emitting light;
a light receiving element provided in a second region in the main surface of the substrate for receiving the light;
a light guide member for guiding the light emitted by the light emitting element to the light receiving element; and
a joint member joining the substrate and the light guide member to fix the light guide member to the substrate,
the gas detection apparatus having an orthogonally applied unit pressure maximum distortion ratio of 143/GPa or more and 10000/GPa or less;
wherein an orthogonal projection image of the joint member to the main surface of the substrate is present in a region Rt, the region Rt being the largest region in the main surface of the substrate sandwiched between a straight line Le and a straight line Ld, where a straight line Lp is a perpendicular bisector of a line segment connecting a center of the first region and a center of the second region, the straight line Le is a straight line parallel to the straight line Lp and passing through the first region, and the straight line Ld is a straight line parallel to the straight line Lp and passing through the second region.

* * * * *